(12) United States Patent
Valpey, III et al.

(10) Patent No.: US 7,593,790 B2
(45) Date of Patent: Sep. 22, 2009

(54) METHOD FOR DESIGNING AEROSOL SPRAY DISPENSERS

(75) Inventors: Richard S. Valpey, III, Lindenhurst, IL (US); Paul A. Clark, Racine, WI (US); Peter S. Smereka, Ann Arbor, MI (US); Padma Prabodh Varanasi, Racine, WI (US); Joel E. Adair, Racine, WI (US)

(73) Assignee: S.C. Johnson & Son, Inc., Racine, WI (US)

( * ) Notice: Subject to any disclaimer, the term of this patent is extended or adjusted under 35 U.S.C. 154(b) by 674 days.

(21) Appl. No.: 11/186,057

(22) Filed: Jul. 21, 2005

(65) Prior Publication Data

US 2006/0026817 A1 Feb. 9, 2006

Related U.S. Application Data

(60) Provisional application No. 60/590,368, filed on Jul. 23, 2004.

(51) Int. Cl.
G05D 7/00 (2006.01)
G06F 19/00 (2006.01)
G06F 17/00 (2006.01)
G01F 1/00 (2006.01)
G01F 17/00 (2006.01)
G06G 7/50 (2006.01)
B65D 83/14 (2006.01)

(52) U.S. Cl. .......................... 700/283; 73/861; 700/97; 700/231; 702/45; 702/50; 703/9; 222/635; 222/645; 222/649

(58) Field of Classification Search ................. 222/635, 222/645, 649; 700/97, 283, 231; 703/9; 702/45, 50; 73/861
See application file for complete search history.

(56) References Cited

U.S. PATENT DOCUMENTS

| | | | |
|---|---|---|---|
| 3,746,253 A * | 7/1973 | Walberg | .................. 239/705 |
| 4,174,386 A | 11/1979 | Spitzer et al. | |
| 4,680,173 A | 7/1987 | Burger | |
| 4,940,171 A | 7/1990 | Gilroy | |
| 5,467,902 A | 11/1995 | Yquel | |
| 5,988,455 A | 11/1999 | Pearson et al. | |
| 6,600,076 B1 * | 7/2003 | Abbott et al. | ................. 568/21 |
| 2004/0144406 A1 * | 7/2004 | Garabedian et al. | ........... 134/26 |
| 2005/0023368 A1 * | 2/2005 | Valpey et al. | ................... 239/1 |
| 2006/0051486 A1 * | 3/2006 | Dowdell et al. | ............. 426/601 |

* cited by examiner

Primary Examiner—Ramesh B Patel
Assistant Examiner—Thomas H Stevens

(57) ABSTRACT

Disclosed is a method of designing an aerosol spray dispensing system. One or more to-be-determined attributes of the spray dispenser system are identified, including properties of a fluid to be dispensed, characteristics of the dispensing mechanism, and performance characteristic values. The identified attributes are determined using equations taking into account relationships among the properties of the fluid to be dispensed, the characteristics of the dispensing mechanism and the performance characteristic values. Once determined, the attributes are used to design the spray dispensing system.

5 Claims, 7 Drawing Sheets

| Example Formula | Exit Orifice | Vapor Tap | Dip Tube | Body Orifice | % Propellant | Stem Orifice | Particle Density Predicted | Particle Density Actual | Obscuration Predicted | Obscuration Actual | Retention Predicted | Retention Actual | Sound Predicted | Sound Actual |
|---|---|---|---|---|---|---|---|---|---|---|---|---|---|---|
| 1 | 0.018 | 0.025 | 0.06 | 0.025 | 17 | 0.048 | 0.03 | 0.03 | 32.0 | 30.8 | 30 | 37 | 62.9 | 64.2 |
| 1 | 0.016 | 0.018 | 0.06 | 0.025 | 17 | 0.048 | 0.04 | 0.04 | 33.8 | 33.4 | 26 | 32 | 64.1 | 64.9 |
| 2 | 0.02 | 0.018 | 0.06 | 0.025 | 19 | 0.048 | 0.04 | 0.03 | 33.4 | 34.9 | 24 | 22 | 63.2 | 64.9 |
| 5 | 0.022 | 0.011 | 0.122 | 0.04 | 15 | 0.12 | 0.06 | 0.07 | 38.9 | 41.6 | 9 | 10 | 82.9 | 83.6 |
| 6 | 0.035 | 0.007 | 0.122 | 0.08 | 15 | 0.12 | 0.10 | 0.10 | 43.9 | 43.2 | 0 | 3 | 86.6 | 86.2 |
| 6 | 0.016 | 0.007 | 0.122 | 0.018 | 15 | 0.12 | 0.05 | 0.04 | 34.4 | 32.0 | 7 | 1 | 80.7 | 79.7 |
| 6 | 0.025 | 0.009 | 0.122 | 0.08 | 15 | 0.12 | 0.08 | 0.08 | 41.1 | 41.0 | 0 | 2 | 84.3 | 83.5 |
| 6 | 0.018 | 0.013 | 0.122 | 0.062 | 15 | 0.12 | 0.06 | 0.06 | 37.3 | 37.1 | 4 | 1 | 82.0 | 83.1 |
| 6 | 0.016 | 0.015 | 0.122 | 0.03 | 15 | 0.12 | 0.05 | 0.04 | 34.6 | 33.5 | 8 | 6 | 80.6 | 79.7 |

Examples Verifying Particle Density, % Obscuration, Retention, and Sound

| | Exit Orifice | Vapor Tap | Dip Tube | Body Orifice | % Propellant | Stem Orifice | Particle Size | | Discharge Rate | | Retention | |
|---|---|---|---|---|---|---|---|---|---|---|---|---|
| | | | | | | | Predicted | Actual | Predicted | Actual | Predicted | Actual |
| 5 | 0.035 | 0.015 | 0.122 | 0.018 | 15 | 0.12 | 72.8 | 70 | 1.4 | 1.2 | 15 | 17 |
| 6 | 0.035 | 0.007 | 0.122 | 0.08 | 15 | 0.12 | 72.9 | 71.1 | 2.8 | 2.8 | 0 | 2.9 |
| 6 | 0.035 | 0.012 | 0.122 | 0.08 | 15 | 0.12 | 75 | 72 | 2.7 | 2.8 | 0 | 2.5 |
| 6 | 0.02 | 0.007 | 0.122 | 0.08 | 15 | 0.12 | 53.3 | 55.9 | 1.5 | 1.6 | 0 | 1.4 |
| 8 | 0.025 | 0 | 0.191 | 0.08 | 6 | 0.096 | 224 | 248 | 2.3 | 2.3 | 4.6 | 2.7 |
| 7 | 0.018 | 0 | 0.122 | 0.04 | 10 | 0.096 | 97.6 | 93.5 | 2 | 2.1 | 1.2 | 1.5 |
| 7 | 0.025 | 0 | 0.191 | 0.04 | 10 | 0.04 | 106 | 105 | 2.1 | 2.1 | 1.1 | 1.5 |
| 7 | 0.025 | 0.005 | 0.191 | 0.04 | 10 | 0.096 | 91.8 | 89 | 2 | 2 | 1.5 | 1.6 |
| 7 | 0.018 | 0.005 | 0.122 | 0.08 | 10 | 0.04 | 91.8 | 90 | 1.4 | 1.3 | 8.1 | 10.2 |

Examples Verifying Particle Size, Discharge Rate, and Percent Retention

*FIG. 5*

| Example Formula | Exit Orifice | Vapor Tap | Dip Tube | Body Orifice | % Propellant | Stem Orifice | Cone Angle | | Plume Distance | | Particle Size | | Discharge Rate | | Retention | |
|---|---|---|---|---|---|---|---|---|---|---|---|---|---|---|---|---|
| | | | | | | | Predicted | Actual | Predicted | Actual | Predicted | Actual | Predicted | Actual | Predicted | Actual |
| 1 | 0.018 | 0.025 | 0.06 | 0.025 | 17 | 0.048 | 18.8 | 19 | 48 | 48.6 | 26.7 | 31.4 | 0.7 | 0.7 | 31 | 36 |
| 1 | 0.016 | 0.018 | 0.06 | 0.025 | 17 | 0.048 | 19.1 | 18.6 | 46.1 | 50.3 | 30 | 34 | 0.8 | 0.9 | 26 | 29 |
| 4 | 0.013 | 0.005 | 0.06 | 0.025 | 13 | 0.048 | 17.4 | 18.5 | 38.3 | 39.9 | 32.3 | 26.7 | 0.9 | 0.8 | 25 | 29 |
| 2 | 0.025 | 0.005 | 0.06 | 0.025 | 19 | 0.048 | 19.5 | 17.5 | 52.9 | 52.8 | 31.7 | 23.2 | 0.9 | 0.6 | 18 | 19 |
| 4 | 0.025 | 0.025 | 0.06 | 0.025 | 13 | 0.048 | 17.6 | 17 | 48.9 | 50.5 | 26.6 | 18.6 | 0.6 | 0.5 | 30 | 28 |
| 3 | 0.025 | 0.025 | 0.06 | 0.025 | 15 | 0.048 | 17.8 | 18.5 | 49.8 | 48.8 | 32.6 | 27.4 | 0.7 | 0.9 | 29 | 23 |

Examples Verifying Particle Size, Cone Angle, and Plume Distance

*FIG. 6*

| Example Formula | Exit Orifice | Vapor Tap | Dip Tube | Body Orifice | % Propellant | Stem Orifice | Particle Density | | Obscuration | | Retention | | Sound | |
|---|---|---|---|---|---|---|---|---|---|---|---|---|---|---|
| | | | | | | | Predicted | Actual | Predicted | Actual | Predicted | Actual | Predicted | Actual |
| 1 | 0.018 | 0.025 | 0.06 | 0.025 | 17 | 0.048 | 0.03 | 0.03 | 32.0 | 30.8 | 30 | 37 | 62.9 | 64.2 |
| 1 | 0.016 | 0.018 | 0.06 | 0.025 | 17 | 0.048 | 0.04 | 0.04 | 33.8 | 33.4 | 26 | 32 | 64.1 | 64.9 |
| 2 | 0.02 | 0.018 | 0.06 | 0.025 | 19 | 0.048 | 0.04 | 0.03 | 33.4 | 34.9 | 24 | 22 | 63.2 | 64.9 |
| 5 | 0.022 | 0.011 | 0.122 | 0.04 | 15 | 0.12 | 0.06 | 0.07 | 38.9 | 41.6 | 9 | 10 | 82.9 | 83.6 |
| 6 | 0.035 | 0.007 | 0.122 | 0.08 | 15 | 0.12 | 0.10 | 0.10 | 43.9 | 43.2 | 0 | 3 | 86.6 | 86.2 |
| 6 | 0.016 | 0.007 | 0.122 | 0.018 | 15 | 0.12 | 0.05 | 0.04 | 34.4 | 32.0 | 7 | 1 | 80.7 | 79.7 |
| 6 | 0.025 | 0.009 | 0.122 | 0.08 | 15 | 0.12 | 0.08 | 0.08 | 41.1 | 41.0 | 0 | 2 | 84.3 | 83.5 |
| 6 | 0.018 | 0.013 | 0.122 | 0.062 | 15 | 0.12 | 0.06 | 0.06 | 37.3 | 37.1 | 4 | 1 | 82.0 | 83.1 |
| 6 | 0.016 | 0.015 | 0.122 | 0.03 | 15 | 0.12 | 0.05 | 0.04 | 34.6 | 33.5 | 8 | 6 | 80.6 | 79.7 |

Examples Verifying Particle Density, % Obscuration, Retention, and Sound

*FIG. 7*

METHOD FOR DESIGNING AEROSOL SPRAY DISPENSERS

This application claims the benefit of U.S. Provisional Application No. 60/590,368, filed Jul. 23, 2004.

FIELD OF THE INVENTION

Our invention relates generally to the field of spray dispensers and methods of designing and employing the same. In particular, our invention relates to the field of designing aerosol dispenser assemblies using a liquefied gas propellant to expel a liquid product from a container. More particularly, our invention relates to the use of a formula to discern design parameters necessary to achieve a specified performance characteristic of an aerosol spray dispenser. However, while the specific examples discussed herein focus on aerosol spray assemblies, our design method may also be employed to design other spray dispensers, such as those operated by pump action.

BACKGROUND OF THE INVENTION

Aerosol dispensers are commonly used to dispense personal, household, industrial, and medical products, and to provide a low cost, easy to use method of dispensing such products. Typically, aerosol dispensers include a container, which contains a liquid product to be dispensed, such as a cleaner, insecticide, hairspray, paint, deodorant, disinfectant, air freshener, or the like. A propellant is used to discharge the liquid product from the container. The propellant is pressurized and provides a force to expel the liquid product from the container when a user actuates the aerosol dispenser by, for example, pressing an actuator button.

The two main types of propellants used in aerosol dispensers today are liquefied gas propellants, such as hydrocarbon and hydrofluorocarbon (HFC) propellants, and compressed gas propellants, such as compressed carbon dioxide or nitrogen gas. To a lesser extent, chlorofluorocarbon propellants (CFCs) are also used. The use of CFCs is, however, being phased out due to the potentially harmful effects of CFCs on the environment.

In an aerosol dispenser using the liquefied gas-type propellant, the container is loaded with the liquid product and propellant to a pressure approximately equal to, or slightly greater than, the vapor pressure of the propellant. Thus filled, the container still has a certain amount of space that is not occupied by liquid. This space is referred to as the "head space" of the dispenser assembly. Since the container is pressurized to approximately the vapor pressure of the propellant, some of the propellant is dissolved or emulsified in the liquid product. The remainder of the propellant is in the vapor phase and fills the head space. As the product is dispensed, the pressure in the container remains approximately constant as liquid propellant evaporates to replenish discharged vapor. In contrast, compressed gas propellants are present entirely in the vapor phase. That is, no portion of a compressed gas propellant is in the liquid phase. As a result, the pressure within a compressed gas aerosol dispenser assembly decreases as the vapor is dispensed.

A conventional aerosol dispenser is illustrated in FIG. 4, and generally comprises a container (not shown) for holding a liquid product and a propellant, and a valve assembly for selectively dispensing a liquid product from the container. As illustrated in FIG. 4, the valve assembly comprises a mounting cup 106, a mounting gasket 108, a valve body 110, a valve stem 112, a stem gasket 114, an actuator cap 116, and a return spring 118. The valve stem 112, stem gasket 114, and return spring 118 are disposed within the valve body 110 and are movable relative to the valve body 110 to selectively control dispensing of the liquid product. The valve body 110 is affixed to the underside of the mounting cup 106, such that the valve stem 112 extends through, and projects outwardly from, the mounting cup 106. The actuator cap 116 is fitted onto the outwardly projecting portion of the valve stem 112 and is provided with an exit orifice 132. The exit orifice 132 directs the spray of the liquid product into the desired spray pattern. A dip tube 120 is attached to the lower portion of the valve body 110 to supply the liquid product to the valve assembly to be dispensed. In use, the whole valve assembly is sealed to the container about its periphery by mounting gasket 108.

In operation, when the actuator cap 116 is depressed, the valve stem 112 is unseated from the mounting cup 106, which unseals the stem orifice 126 from the stem gasket 114 and allows the liquid product to flow from the container, through the valve stem 112. Flow occurs because propellant forces the liquid product up the dip tube 120 and into the valve body 110 via a body orifice 122. In the valve body 110, the liquid product is mixed with additional propellant supplied to the valve body 110 through a vapor tap 124. The vapor tap 124 introduces additional propellant gas into the valve body 110, in order to help prevent flashing of the liquefied propellant, and to increase the amount of pressure drop across the exit orifice, which has the added benefit of further breaking-up the dispensed particles. From the valve body 110, the product is propelled through a stem orifice 126, out the valve stem 112, and through an exit orifice 132 formed in the actuator cap 116.

S.C. Johnson & Son, Inc. (S.C. Johnson) employs an aerosol valve similar to that shown in FIG. 4 in connection with their line of Glade® aerosol air fresheners. The propellant used to propel the air freshener liquid product from the container is a B-Series liquefied gas propellant having a propellant pressure of 40 psig (B-40), at 70 degrees F. (2.72 atm at 294 K.). "Propellant pressure" refers to the approximate vapor pressure of the propellant, as opposed to "can pressure," which refers to the initial gauge pressure contained within a full aerosol container. The B-40 propellant is a composition of propane, normal butane, and isobutane. By normal butane it is meant the composition denoted by the chemical formula C4H10, having a linear backbone of carbon. This is in contrast to isobutane, which also has the chemical formula C4H10, but has a non-linear, branched structure of carbon. In order to effectively dispense this air freshener composition, the aerosol dispenser used by S.C. Johnson in connection with their line of Glade® aerosol air fresheners has a stem orifice diameter of 0.025" (0.635 mm), a vapor tap diameter of 0.020" (0.508 mm), a body orifice diameter of 0.062" (1.575 mm), and a dip tube inner diameter of 0.060" (1.524 mm). This current Glade® aerosol air freshener requires that the B-40 propellant be present in the amount of approximately 29.5% by weight of the contents of the dispenser assembly in order to satisfactorily dispense the air freshener liquid product.

Hydrocarbon propellants, such as B-40, contain Volatile Organic Compounds (VOCs). The content of VOCs in aerosol air fresheners is regulated by various federal and state regulatory agencies, such as the Environmental Protection Agency (EPA) and California Air Resource Board (CARB). S.C. Johnson continuously strives to provide environmentally friendly products and regularly produces products that exceed government regulatory standards. It is in this context that we set out to produce an aerosol dispenser assembly having a reduced VOC content.

One way to reduce the VOC content in such aerosols is to reduce the amount of the propellant used to dispense the liquid product. However, we have discovered that a reduction in the propellant content adversely affects the product performance. Specifically, reducing the propellant content in the aerosol air freshener resulted in excessive product remaining in the container after the propellant is depleted (product retention), an increase in the size of particles of the dispensed product (increased particle size), and a reduction in spray rate, particularly as the container nears depletion. For an air freshener dispenser, however, it is desirable to minimize the particle size of a dispensed product, to maximize the dispersion of the particles in the air and to prevent the particles from "raining" or "falling out" of the air. Thus, we set out to develop an aerosol dispenser assembly that can satisfactorily dispense an aerosol product that contains, at most, 25% by weight, of a liquefied gas propellant, while actually improving product performance throughout the life of the dispenser assembly. (As used herein, the "life of the dispenser assembly" is defined in terms of the amount of propellant within the container (i.e., the can pressure), such that the life of the dispenser assembly is the period between when the pressure in the container is at its maximum (100% fill weight) and when the pressure within the container is substantially depleted, i.e., equal to atmospheric pressure. Some amount of liquid product may remain at the end of the life of the dispenser assembly. Also as used herein, all references to pressure are taken at 70° F. (294 K.), unless otherwise noted.)

Consequently, our design method tackled the idea of identifying preferred performance characteristics of a spray dispenser and providing a novel system for calculating design variables/factors of a spray dispenser that achieve the desired performance characteristics. In other words, in developing a preferred aerosol dispenser assembly that achieved the preferred spray attributes with a reduced VOC content, we simultaneously developed a novel method of calculating design variables that can achieve any one of a number of possible performance characteristics without the need for repetitive trial and error. In addition, based on that method, we also were able to design a formula for predicting which combination of design factors would provide a desired performance characteristic.

Given the effect of VOC's on the environment, expected government restrictions on the VOC content through government regulations in the future, and the ever changing desires of customers of such products unrelated to VOC content, our system is useful in developing products having enhancements for future spray dispenser products, aerosol or otherwise.

Our examples focus on aerosol dispensers inasmuch as we are interested in reducing VOC content while optimizing preferred spray attributes, but one of ordinary skill in the art would understand that our methods would also apply to non-aerosol dispensers. Moreover, in addition to being useful in designing dispensers with reduced VOC content, our invention is also useful in designing dispensers with enhanced performance characteristics. In that regard, in non-aerosol dispensers, it is still desired to optimize performance characteristics to please customers and/or to provide a device that is more cost effective or easier to manufacture.

Examples of these performance characteristics include particle size, discharge rate, sound, particle density, obscuration, cone angle, pressure, plume distance, and percent retention. To the extent that these performance characteristics can be optimized the overall efficacy of the aerosol dispensing system can be increased. However, while some performance characteristics may be more important in some applications, those same performance characteristics will be less important in other applications.

One such performance characteristic is particle size. In this regard, smaller particles are more desirable for air deodorizers and the like in which full evaporation of the dispensed particles is desired. One known method of reducing the particle size of a dispensed liquid product is disclosed in U.S. Pat. No. 3,583,642 to Crowell et al. (the '642 patent), which is incorporated herein by reference. The '642 patent discloses a spray head that incorporates a "breakup bar" for inducing turbulence in a product/propellant mixture prior to the mixture being discharged from the spray head. Such turbulence contributes to reducing the size of the mixture particles discharged from the spray head.

Of course, one can also imagine a scenario in which larger particles are desirable, or even a scenario in which the size of the particle is of relatively no importance. Instead, it may be desirable to optimize one or more other performance characteristics, including discharge rate, sound, particle density, obscuration, cone angle, pressure, plume distance, and percent retention.

Our invention provides novel methods of achieving these desired performance characteristics, of reducing/controlling VOC content, and of determining attributes of liquids suitable for given dispensers, as will be discussed in more detail below.

SUMMARY OF THE INVENTION

Our invention provides a method of determining design values for a design of an improved spray dispenser assembly and manufacturing the same. More preferably, our invention is directed to designing improved aerosol dispenser assemblies that exhibit desired performance characteristics with minimal research and development. More specifically, our invention is directed to a method of designing a spray dispenser by ascertaining values of unknown design variables for designing an enhanced spray dispenser assembly having a specified, preferred performance characteristic (including VOC content).

According to one aspect of our invention, a method of designing an aerosol spray dispensing system having a minimized VOC content includes a predetermining step, a determining step, a selecting step, a calculating step, and a designing step. In the predetermining step, a VOC content for the aerosol spray dispensing system is predetermined. In the determining step, the properties of a formula to be dispensed by the aerosol spray dispensing system, including a viscosity, a density, a surface tension and a partition coefficient are determined. In the selecting step, a value for each of one or more performance characteristics for the aerosol spray dispensing system from the group consisting essentially of particle size, discharge rate, sound, particle density, obscuration, cone angle, pressure, plume distance, and percent retention are selected. In the calculating step, one or more design characteristics of an aerosol container that will achieve, for the given VOC content and the determined formula properties, the selected value for each of the one or more performance characteristics, using one or more equations taking into account relationships among the predetermined VOC content, the given properties of the formula, the one or more performance characteristics, and the design characteristics are calculated. In the designing step, the aerosol spray system is designed using the calculated design characteristics.

According to another aspect of our invention, a method of designing an aerosol spray dispensing system having a minimized VOC content includes a predetermining step, a first determining step, a selecting step, a second determining step, and a designing step. Specifically, according to those steps, a VOC content is predetermined for the aerosol spray dispensing system, fluid properties of a formula to be dispensed by the aerosol spray dispensing system are determined, a value for each of one or more performance characteristics ($\Phi$) for the aerosol spray dispensing system is selected, and values of one or more design variables of the aerosol dispenser are determined in accordance with the following equation:

$$\Phi = a_0 + \sum_{i=1}^{n} b_i x_i + \sum_{i=1}^{n} \sum_{j=1}^{n} c_{ij} x_i x_j + \sum_{i=1}^{n} \sum_{j=1}^{n} \sum_{k=1}^{n} d_{ijk} x_i x_j x_k,$$

and an aerosol dispensing system is designed according to the values of the design variables determined in the determining step. In the equation, $x_1$-$x_n$ include the VOC content for the aerosol spray dispensing system, fluid properties of the formula, and the design variables, and a, b, c, and d are coefficients unique to each of the one or more performance characteristics.

While we have recited five dispenser design variables and seven formula design variables, such should not be taken as limiting. We recite all of these variables only because we believe they are the preferable variables for obtaining good results, but we understand that more or less design variables may be used to practice our invention. Most preferably, we contemplate that three or more dispenser design variables may be sufficient, and that one or more formula design variables may be sufficient. As would be understood by one of ordinary skill in the art, when more or less design variables are used, the formula can be re-stated to take into account the differing numbers of design variables.

Moreover, as will be appreciated from the following discussion, our invention provides novel methods for determining not only design variables of a dispenser and of a formula to be dispensed from a dispenser, but also for ascertaining other characteristics of spray dispensing systems, including, for example, values of preferred design characteristics and values of VOC levels within the system.

A better understanding of these and other aspects, features, and advantages of the invention may be had by reference to the drawings and to the accompanying description, in which preferred embodiments of the invention are illustrated and described.

BRIEF DESCRIPTION OF THE DRAWINGS

FIGS. 5-7 illustrate data obtained according to methods of the present invention.

Throughout the figures, like or corresponding reference numerals denote like or corresponding parts.

DETAILED DESCRIPTION OF THE PREFERRED EMBODIMENTS

Figure 2:
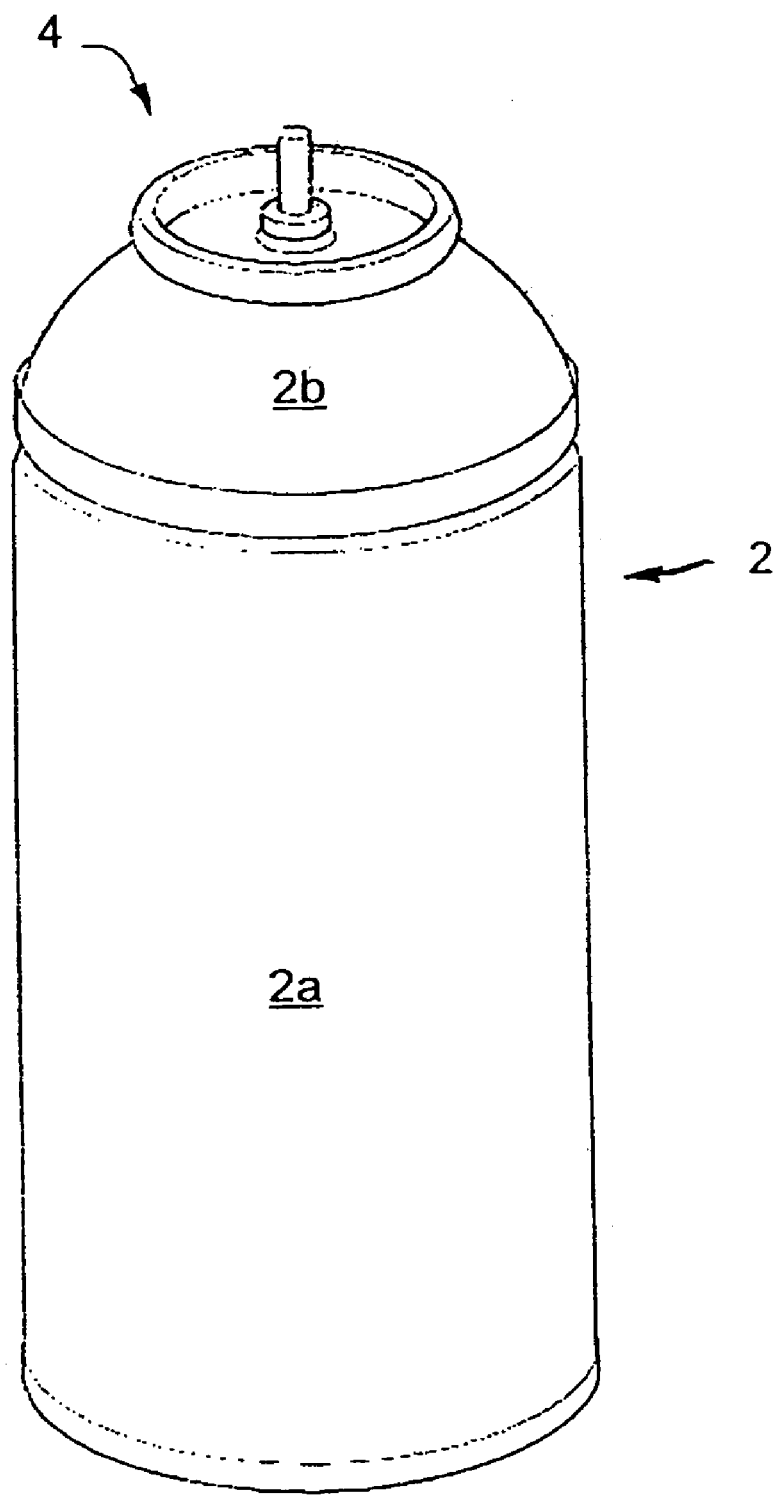
FIG. 2 is a perspective view of the aerosol dispenser assembly of the first embodiment.
Figure 3:
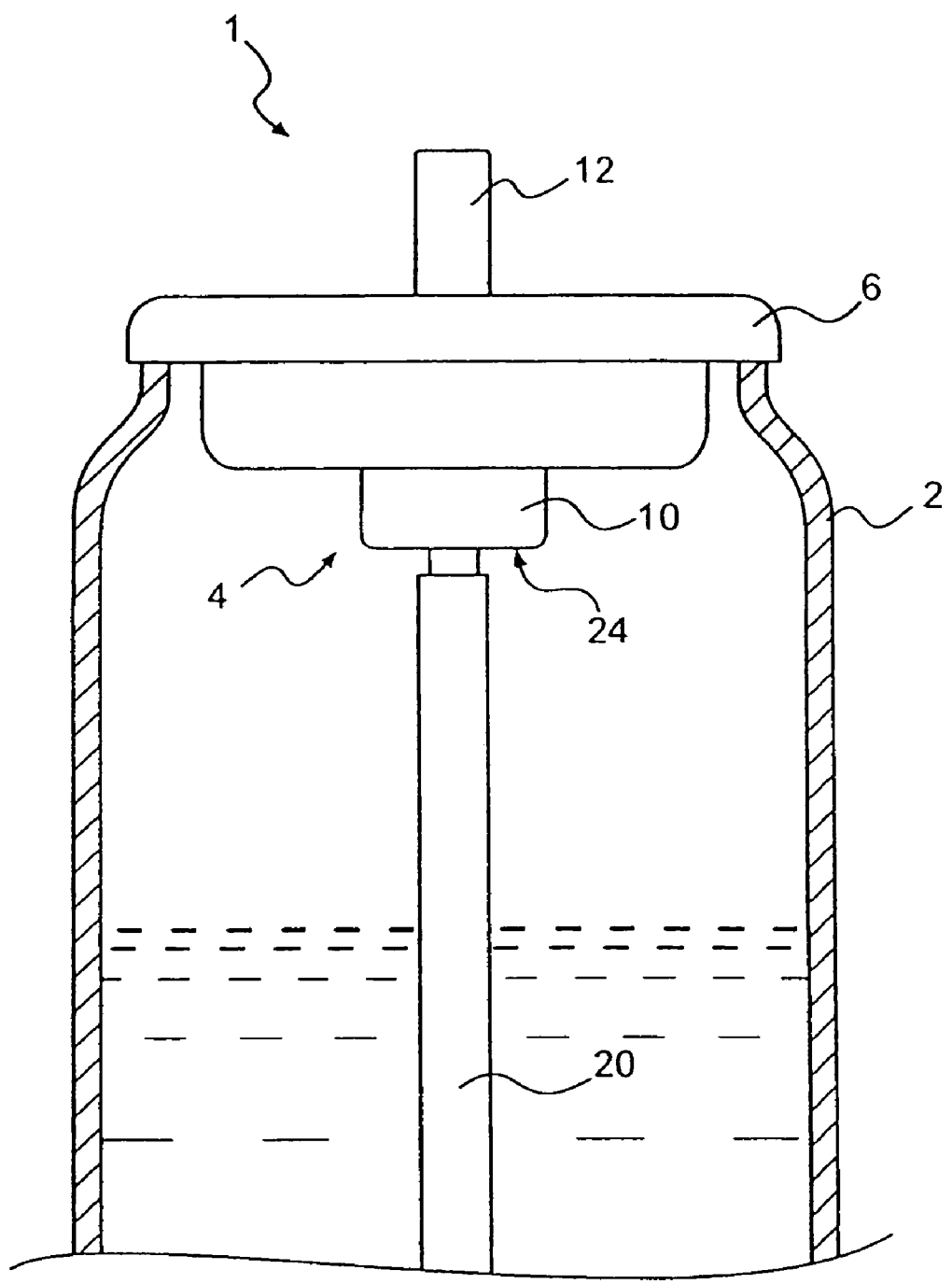
FIG. 3 is a front view of the aerosol dispenser assembly of the first embodiment, with the container cut away for clarity.
Figure 4:
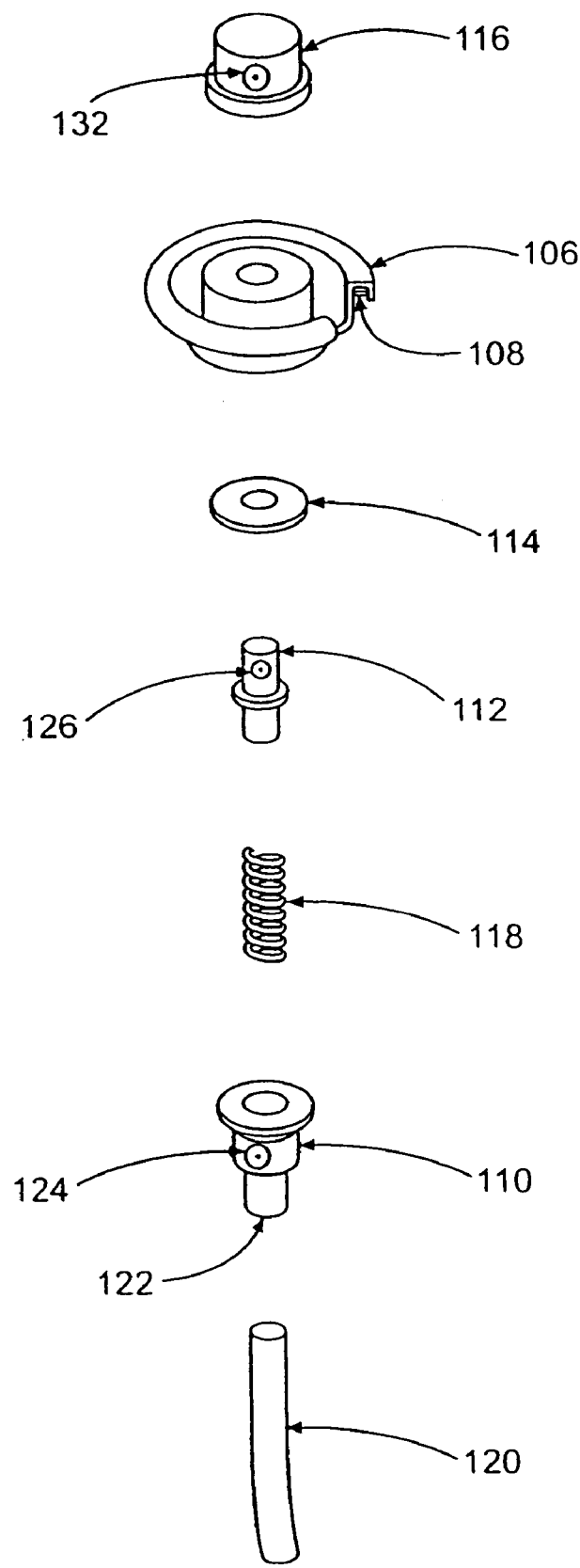
FIG. 4 is an exploded view of a conventional aerosol valve assembly and actuator cap, illustrating the individual components.

As shown in FIGS. 2 and 3, an aerosol dispenser assembly according to our invention generally comprises a container 2 with a valve assembly 4 disposed in the top thereof for selectively dispensing a liquid product from the container 2. As depicted, the container includes a generally cylindrical base 2$a$ with domed top 2$b$.

Figure 1:
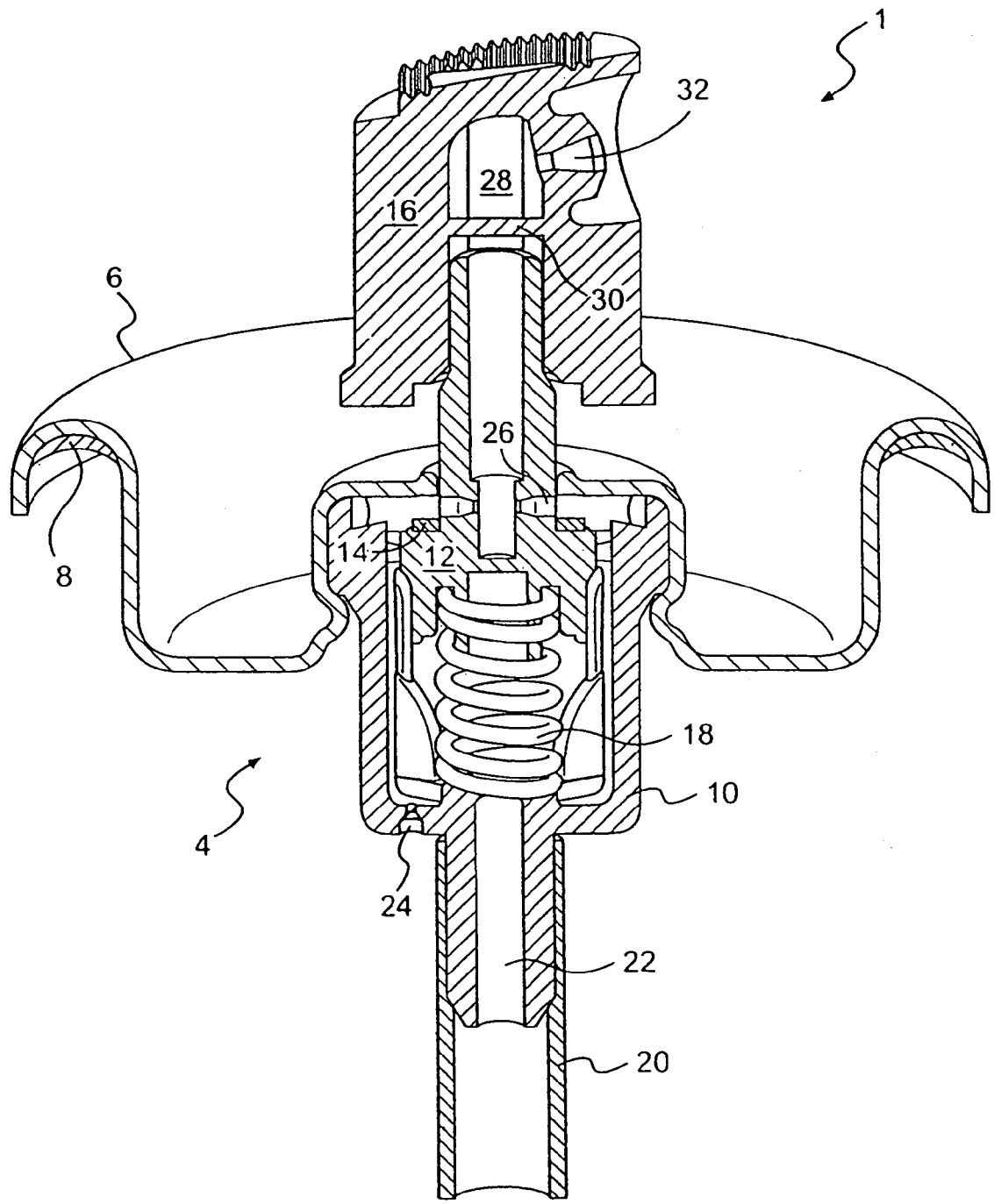
FIG. 1 is a cross-sectional perspective view of a first embodiment of the valve of the present invention.

With reference to FIG. 1, the valve assembly 4 further comprises a mounting cup 6, a mounting gasket 8, a valve body 10, a valve stem 12, a stem gasket 14, an actuator cap 16, and a return spring 18. The actuator cap 16 defines an exit path 28 and an actuator orifice 32. The valve stem 12, stem gasket 14, and return spring 18 are disposed within the valve body 10 and are movable relative to the valve body 10. The valve body 10 is affixed to the underside of the mounting cup 6, such that the valve stem 12 extends through, and projects outwardly from, the mounting cup 6. The actuator cap 16 is fitted onto the outwardly projecting portion of the valve stem 12, and a dip tube 20 is attached to the lower portion of the valve body 10. The whole valve assembly 4 is sealed to the container 2 by the mounting gasket 8.

While the dispenser assembly shown in FIG. 1 employs a vertical action-type cap 16, it will be understood that any suitable valve type may be used, such as, for example, a tilt action-type cap. In addition, instead of the simple push-button actuator cap 16 shown in FIG. 1, it will be understood that any suitable actuator may be used, such as, for example, an actuator button with an integral overcap, a trigger actuated assembly, or the like.

In operation, when the actuator cap 16 of the dispenser 1 is depressed, it forces the valve stem 12 to move downward, thereby allowing the liquid product to be dispensed. The propellant forces the liquid product up the dip tube 20 and into the valve body 10 via a body orifice 22. In the valve body 10, the liquid product is mixed with additional propellant supplied to the valve body 10 through a vapor tap 24. The additional propellant introduced through the vapor tap 24 prevents flashing of the liquefied propellant, and increases the amount of pressure drop across the exit orifice, thereby increasing the particle break-up. From the valve body 10, the liquid product is propelled through at least one stem orifice 26, out the valve stem 12, and through an exit path 28 formed in the actuator cap 16. A single stem orifice 26 may be used; however, we have found that using two (as shown in FIG. 1), or preferably four, stem orifices 26 spaced around the periphery of the valve body 10 facilitates greater flow and superior mixing of the product as it is dispensed.

FIG. 1 depicts a breakup bar 30 in the exit path 28, such that the product is forced to diverge around the breakup bar 30, thereby inducing turbulence in the flow of the product, further reducing the particle size of the product. The product is then expelled from the actuator cap 16 through an actuator orifice 32, which disperses the product and produces a desired spray pattern. Instead of a breakup bar as shown in FIG. 1, the dispenser assembly might employ a pair of breakup plates positioned in or below the exit path 28, a swirl chamber positioned immediately upstream of the exit orifice 32, or other similar mechanical breakup features. While mechanical breakup features provide some additional break-up of the product prior to being dispensed, we have found that other factors have a much greater impact on particle size than these mechanical breakup features. Nonetheless, these mechanical breakup features may be used to even further reduce the size of the dispensed particles, but such mechanical breakup features are not necessary or preferred.

As noted above, we found that reducing the hydrocarbon propellant content of an aerosol air freshener to at most 25% by weight adversely affected the product performance. Specifically, reducing the propellant content in the aerosol air freshener resulted in excessive product retention, decreased spray rate as the container became depleted, and an increased particle size. Consequently, the air freshener exhibited excessive raining or falling out of the liquid product. In order to correct these adverse effects, we tested various different types of propellants, pressures, and valve orifice dimensions to set a threshold design on which to develop our system of designing an improved spray dispenser.

In particular, we tested two types of propellants, A-Series and B-Series propellants. Both types of propellants were found to be suitable for dispensing a liquid product from a container. We found, however, that the A-Series propellants that we tested unexpectedly produced a mist having a significantly smaller particle size than did the B-series propellants, under the same conditions. This difference was especially pronounced toward the end of the life of the dispenser assembly, when the pressure remaining in the container was lower. We believe that the superior mist producing ability of the A-Series propellants is due to the absence of normal butane in the A-Series propellants. As described above, the B-Series propellants contain a combination of propane, normal butane, and isobutane. In contrast, the A-series propellant does not contain any normal butane. When the dispenser assembly is shaken prior to use, the liquid product and the propellant form an oil-out emulsion. That is, small droplets of the liquid product are coated with a layer of fragrance oil and propellant, the aqueous phase liquid product being suspended in a layer of non-aqueous phase propellant and fragrance oil. When the emulsion is expelled from the pressurized dispenser assembly, the liquefied gas instantly evaporates, causing the droplets to “burst” and creating a fine mist of liquid product in the air. The absence of normal butane in the A-Series propellant is thought to facilitate a greater burst of mist, thereby reducing the particle size of the dispensed mist. This reduced particle size allows a greater amount of the dispensed product to remain suspended in the air for a longer period of time, thus, increasing the air freshening efficacy of the product.

While the invention is disclosed as being primarily used in connection with a hydrocarbon propellant, it should be understood that the invention could be adapted for use with other sorts of propellants. For example, HFC, dimethyl ether (DME), and CFC propellants might also be used in connection with a variation of the dispenser assembly of our invention. Also, it should be noted that propellants are typically only necessary in aerosol devices. While a preferred embodiment involves designing aerosol dispensers, other embodiments may include other spray dispensers, such as pump spray devices in which a pumping mechanism is used in the place of a propellant. Other such spray dispensers are known in the art.

We tested various different propellant pressures and found that, in general, higher-pressure propellants tended to dispense the product as a mist having smaller particle size than did lower-pressure propellants. In addition, the higher-pressure propellants somewhat reduced the amount of product retained in the container at the end of the life of the dispenser assembly. However, simply increasing the pressure in the prior art aerosol dispensers, without more, was found to be insufficient to expel a satisfactory amount of the liquid product from the container. Thus, we also examined the aerosol valve itself to determine how best to reduce the amount of product retention, while maintaining a satisfactorily small particle size of the dispensed product.

In order to minimize the amount of product retention of the dispenser assembly, we found that it was desirable to increase the amount of liquid product dispensed per unit of propellant. That is, by making the dispensed ratio of liquid product to propellant smaller (i.e., creating a leaner mixture), the same amount of propellant will be able to exhaust a greater amount of liquid product. Several valve components are known to affect the dispensed ratio of liquid product to propellant, including the vapor tap, the stem orifice, the body orifice, the exit orifice, and the inner diameter of the dip tube.

In general, we found that decreasing the size of the vapor tap has the effect of creating a leaner mixture. However, reducing the size of the vapor tap also has the side effect of increasing the particle size of the dispensed product. Conversely, we found that decreasing the size of the stem orifice, body orifice, exit orifice and/or dip tube inner diameter generally decreases the spray rate and the particle size.

Based on our experimentations, we determined that certain combinations of propellant type, can pressure, and valve orifice dimensions, produced a dispenser assembly that contains at most 25% by weight of a hydrocarbon propellant and has superior product performance over the prior art dispenser assemblies.

We also found that A-Series propellants, which are free from normal butane, exhibit reduced particle size of the dispensed product.

A dispenser assembly having a can pressure of between 55 psig (3.74 atm) and 120 psig (8.17 atm) was found to help reduce product retention while also reducing the particle size of the dispensed product. As noted above, can pressure refers to the initial gauge pressure contained within the aerosol container. Still higher pressures could also be effectively used to dispense the liquid product from the container. As the pressure within the aerosol dispenser assembly is increased, however, the strength of the aerosol dispenser container (also referred to as an aerosol can) must also be increased. Federal regulations (DOT ratings) govern the strength of pressurized containers and specify that aerosol cans must meet a certain can rating for a given internal pressure. Specifically, aerosol cans having an internal pressure of 140 psig or less at 130° F. (9.53 atm at 327 K.) are known as “regular” or “unrated,” since a higher DOT rating is not required. Aerosol cans having an internal pressure of 160 psig or less at 130° F. (10.9 atm at 344 K.) have a DOT rating of 2P, and cans having an internal pressure of 180 psig or less at 130° F. (12.3 atm at 355 K.) have a DOT rating of 2Q. The higher the specified can rating, the stronger the aerosol can must be. Generally, a can having a higher rating will be more costly due to increased material and/or manufacturing costs. Thus, in order to minimize costs, it is preferable to use the lowest pressure possible while still maintaining satisfactory product performance. In this regard, we found that can pressures of between 55 psig (3.74 atm) and 80 psig (5.44 atm), again measured at 70 degrees F. (294 K.), were especially preferred because they require a lower can rating than would higher can pressures and are still capable of achieving the advantages of the present invention (i.e., reduced propellant content, reduced particle size, and minimal product retention).

We also found that the dispenser assembly of FIG. 1 was capable of satisfactorily dispensing an aerosol product that contains at most 25% by weight of a liquefied gas propellant, when the diameter of the vapor tap 24 is between about 0.013" (0.330 mm) and about 0.019" (0.483 mm), the diameter of the stem orifice 26 is between about 0.020" (0.508 mm) and about 0.030" (0.762 mm) when a single stem orifice is used (between about 0.014" (0.356 mm) and about 0.025" (0.635 mm) when a pair of stem orifices are used), the diameter of the body orifice is between about 0.050" (1.270 mm) and about 0.062" (1.575 mm), the diameter of the exit orifice 32 is between about 0.015" (0.381 mm) and about 0.022" (0.559 mm), and the inner diameter of the dip tube is between about 0.040" (1.016 mm) and about 0.060" (1.524 mm).

Thus, any of the above-described valve components, propellant types, propellant pressures, and valve orifice dimensions, may be used in combination to provide a dispenser assembly according to our invention.

In a first preferred embodiment of the invention, the aerosol dispenser assembly 1 uses an A-Series propellant having a propellant pressure of about 60 psig (4.1 atm) (i.e., A-60 propellant) to dispense the liquid product from the container 2. In this embodiment, the container is initially pressurized to a can pressure of about 70 psig (4.8 atm) to about 80 psig (5.4 atm). The diameter of the vapor tap 24 in this embodiment is about 0.016" (0.406 mm). Two stem orifices 26 are used, each having a diameter of about 0.024" (0.610 mm). The diameter of the body orifice is about 0.050" (1.270 mm), the diameter of the exit orifice 32 is about 0.020" (0.508 mm), and the inner diameter of the dip tube is about 0.060" (1.52 mm). Furthermore, a breakup bar 30 is positioned in the exit path 28 of the actuator 16 in order to further reduce the particle size of the dispensed product.

A second preferred embodiment of the dispenser assembly 1 employs a single stem orifice 26. In this embodiment, the dispenser assembly 1 also uses the A-60 propellant and a can pressure of about 70 psig (4.8 atm) to about 80 psig (5.4 atm) to dispense the liquid product from the container 2. The diameter of the vapor tap is about 0.016" (0.406 mm), the diameter of the single stem orifice is about 0.025" (0.635 mm), the diameter of the body orifice is about 0.062" (1.575 mm), and the inner diameter of the dip tube is about 0.060" (1.524 mm). This embodiment also employs a breakup bar, positioned in the exit path of the actuator to further reduce the particle size of the dispensed product. The following table T.1 describes the performance of the dispenser assemblies according to the first and second preferred embodiments, respectively.

| T. 1 - Performance of Embodiments One and Two | | |
|---|---|---|
| Propellant Type | A-60 | A-60 |
| Propellant Level (wt. %) | 24.5 | 24.5 |
| Body Ofifice Diameter (mm) | 1.58 | 1.27 |
| Vapor Tap Diameter (mm) | 0.406 | 0.406 |
| Stem Orifice Area (mm$^2$) | 0.317 | 0.584 |
| Exit Orifice Diameter (mm) | 0.508 | 0.508 |
| Dip Tube Diameter (mm) | 1.52 | 1.52 |
| Mechanical Breakup | Yes | Yes |
| Spray Rate (g/s) 100% Full | 1.23 | 1.27 |
| 75% Full | 1.18 | 1.15 |
| 50% Full | 1.15 | 1.12 |
| 25% Full | 1.07 | 1.05 |
| Particle Size (µm) 100% Full | 29 | 29 |
| 75% Full | 30 | 30 |
| 50% Full | 29 | 32 |
| 25% Full | 32 | 34 |
| Retention (wt. %) | 1.26 | 1.76 |

These preferred embodiments of the dispenser assembly are capable of dispensing the liquid product contained within the container as a mist having an average particle size of less than 35 micrometers (0.0014"), over at least 75% of the life of the dispenser assembly. Because the dispensed mist has such a small particle size, the particles are more easily dispersed in the air and less fallout is experienced. This reduction in the amount of fallout increases the dispenser assembly's air freshening efficacy and helps to prevent undesirable residue of the liquid product from settling on flat surfaces, such as, countertops, tables, or floors.

Moreover, both preferred embodiments of the dispenser assembly are capable of dispensing over 98% by weight of the liquid product from the container. It is important that substantially all of the product can be dispensed, to ensure that product label claims will be met. Also, by minimizing the amount of product retained in the container at the end of the life of the dispenser assembly, less liquid product is wasted. This is important from a consumer satisfaction standpoint, since consumers tend to be more satisfied with a dispenser assembly when substantially all of the liquid product can be dispensed.

With the foregoing preferred embodiments as a threshold, we began to take a more focused approach to reducing the propellant content of a dispenser assembly even further. Our goal at this stage was to produce an aerosol dispenser assembly that could effectively dispense its contents using as little propellant as possible, but not more than about 15% liquefied gas propellant by weight. In doing so, we also developed a method of achieving improved dispenser characteristics through a novel system of analyzing factors affecting such attributes and calculating preferred combinations of the same to achieve the desired attributes.

Initially, we identified several performance characteristics upon which to measure the performance of a given dispenser assembly configuration. Examples of these performance characteristics include the average diameter of particles dispensed during the first forty seconds of spray of the assembly, the average spray rate during the first forty seconds of spray of the assembly, and the amount of the product remaining in the container at the end of the life of the assembly, expressed as a percentage of the initial fill weight, where the term "fill weight" refers to the weight of all of the contents of the container, including both the liquid product and the propellant. For example, consumer testing and air freshening efficacy dictate that for an aerosol-based air fresheners the particle size should preferably be in the range of about 15 and about 60 micrometers, more preferably between about 25 and about 40 micrometers, and most preferably between about 30 and about 35 micrometers. The spray rate for these air fresheners should preferably be between about 0.6 and 1.8 g/s, more preferably between about 0.7 and about 1.4 g/s, and most preferably between about 1.0 and about 1.3 g/s. The amount of liquid product remaining in the can at the end of the life of the dispenser assembly is preferably less than about 3% of the initial fill weight, more preferably less than about 2% of the initial fill weight, and most preferably less than about 1% of the initial fill weight.

Of course, these specific performance characteristics are merely exemplary. For example, the particle size for air freshener will typically be much smaller than that for, e.g., a furniture cleaner. Also, while it may be desirable to control the particle size of a dispensed air freshener, the size of the particle may be less critical for a furniture spray, for which it may be more desirable to control the spray width. When a non-aerosol device is used, the characteristics of importance may also change. Other important performance characteristics that could be identified and studied include, but are not limited to, relative span factor, particle density, obscuration, sound level (of the spray), plume distance, cone angle, fill speed, spray width, can pressure, sputter point, stream point, retention, and others. We have also found that it is desirable to identify and study many of these performance characteristics at various times in the life of an aerosol dispenser, for example, during the first forty seconds of spray of the container, and at some time later in the life of the dispenser.

The desired performance characteristics can be identified by, at least, analysis by designers in the field, and consumer testing.

Once we determined various performance characteristics to be studied, we then determined factors that are known, or thought to affect, these performance characteristics. These factors were thought to include propellant content, dip tube inner diameter, body orifice diameter, vapor tap diameter, stem orifice diameter, mechanical breakup elements, exit orifice diameter, and land length (essentially the axial length of the exit orifice). To determine these factors, experiments were conducted in which several factors were varied independently to determine the magnitude of the effect each factor had on each performance characteristic. Initially, the original Glade® dispenser assembly and the above-described first and second embodiments were used. These were then modified to vary each of the several factors individually, and the magnitude of the effect each of the factors had on the performance characteristics was determined using a $2^k$ factorial experimental design. A more complete explanation of the $2^k$ factorial tests used to ascertain the effect of the factors is discussed in U.S. patent application Ser. No. 10/896,897, entitled "Method of Designing Improved Spray Dispenser Assemblies," which was filed on the same day as this application, and which is a continuation-in-part of U.S. patent application Ser. No. 10/653,211, filed on Sep. 3, 2003, now U.S. Pat. No. 7,014,127, which is a continuation-in-part of U.S. patent application Ser. No. 10/350,011, which was filed on Jan. 24, 2003, now U.S. Pat. No. 6,824,079. The disclosure of each of these three applications is incorporated by reference herein.

From these tests, five factors, or design variables of the dispenser assembly (the "designated factors") were determined to have the greatest effect on the performance characteristics. These variables were dip tube inner diameter, vapor tap diameter, body orifice diameter, stem orifice diameter, and exit orifice diameter.

As discussed in the copending application directed to "Method of Designing Improved Sprayer Dispenser Assemblies," we used those identified variables to design a novel method of determining which combinations of values for those factors would lead to a design for a spray dispenser that achieved a set of predetermined performance characteristics. More specifically, we designed a novel method of identifying necessary values of the design factors to achieve specified performance characteristics. The method generally involved, after identifying the performance characteristics of interest, performing experimentation and statistical modeling to determine the design specifications of a spray assembly achieving the performance characteristics with limited rudimentary trial-and-error science that conventionally ruled such projects.

After achieving our novel method, we took the idea a step further, and set off to design a formula, or set of formulae, which predicted the necessary design parameters for achieving a predetermined performance characteristic with no experimentation. In doing so we improved on our simple method by reducing it to one or more formulae, as discussed below.

From testing our method, we discovered that other variables also affect the performance characteristics. In particular, we knew from the tests described above that the amount of propellant used also influenced the performance characteristics. For example, a decreased amount of propellant leads to larger diameter particles. We also discovered that the fluid properties of the formula to be dispensed influenced the performance characteristics. For example, we found that the viscosity of the formula, the density of the formula, and the surface tension of the formula all had an appreciable effect on the performance characteristics.

Thus, we had conceived of numerous design variables, each of which affects various performance characteristics of an aerosol spray system in some way. In designing our method, we had performed numerous tests and collected a large amount of data relating to the relationships between these variables and the performance characteristics, and as we became more intimate with the data, we found that we could predict with some certainty what impact a change in one or more of the variables would have on a given performance characteristic and on the other variables.

Consequently, we endeavored to design a formula that would predict the necessary values of the design factors, taking into account interdependence of variations in those variables to achieve a predetermined performance characteristic. Such endeavor resulted in the following equation:

$$\Phi = a_0 + \sum_{i=1}^{n} b_i x_i + \sum_{i=1}^{n} \sum_{j=1}^{n} c_{ij} x_i x_j + \sum_{i=1}^{n} \sum_{j=1}^{n} \sum_{k=1}^{n} d_{ijk} x_i x_j x_k,$$

in which $\Phi$ represents a performance characteristic, $x_1$, $x_2$, ..., $x_n$ represent the different design factors, and the coefficients a-d are determined from experimental data using the method of least squares. These coefficients are unique for each performance characteristic to be determined.

As set forth in provisional application No. 60/590,368, the disclosure of which is hereby incorporated by reference, we initially considered nine design variables to be important, and we developed the following equation:

$$\Phi = a_0 + \sum_{i=1}^{9} b_i x_i + \sum_{i=1}^{9} \sum_{j=1}^{9} c_{ij} x_i x_j + \sum_{i=1}^{9} \sum_{j=1}^{9} \sum_{k=1}^{9} d_{ijk} x_i x_j x_k,$$

In the equation, $x_1$ through $x_9$ are the design variables; $x_1$ is a body orifice diameter, $x_2$ is an exit orifice diameter, $x_3$ is a dip tube inner diameter, $x_4$ is a stem orifice inner diameter, $x_5$ is a vapor tap diameter, $x_6$ is a propellant level expressed as weight percent of total formula, $x_7$ is formula viscosity, $x_8$ is formula density, and $x_9$ is formula surface tension; and a, b, c, and d are coefficients unique to the selected performance characteristic.

Subsequently, we have found that our ability to predict the interrelationships between the design factors and performance characteristics is even more accurate when additional, more detailed features of the fluid dispensed from the system are considered. Accordingly, we have now developed the following equation, which takes into account thirteen design variables:

$$\Phi = a_0 + \sum_{i=1}^{13} b_i x_i + \sum_{i=1}^{13} \sum_{j=1}^{13} c_{ij} x_i x_j + \sum_{i=1}^{13} \sum_{j=1}^{13} \sum_{k=1}^{13} d_{ijk} x_i x_j x_k,$$

In this equation, $\Phi$ represents a performance characteristic, $x_1$ represents the exit orifice diameter (in thousandths), $x_2$ represents the vapor diameter (in thousandths), $x_3$ is the dip tube inner diameter (in thousandths), $x_4$ represents the body orifice diameter (in thousandths), $x_5$ is the propellant level expressed as weight percent of total formula, $x_6$ is the stem cross sectional area (in squared thousandths), $x_7$ is the formula density (in grams per milliliter), $x_8$ is the formula low sheer viscosity (in Centipoises, measured at 50 RPM using the cone and plate method described in ASTM D 4287-94 in *Book of ASTM standards*, American Society for Testing and Materials, West Conshohocken, Pa.), $x_9$ is the formula high sheer viscosity (in Centipoises, measured at 2000 RPM using the cone and plate method described in ASTM D 4287-94 in *Book of ASTM standards*, American Society for Testing and Materials, West Conshohocken, Pa.), $x_{10}$ is the initial surface tension (in mN/m, representing the value for a freshly formed bubble on a Kraus Bubble Pressure Tensiometer), $x_{11}$ is the equilibrium surface tension (in mN/m, representing the value at which the measurement on a Kraus Bubble Pressure Tensiometer levels off), $x_{12}$ is the partition coefficient (volume percent of organic phase/100), $x_{13}$ is the formula Zahn viscosity (in Centistokes), and the coefficients a-d are determined from experimental data using the method of least squares. Again, these coefficients are unique for each performance characteristic to be determined.

Using the foregoing equation, and the experimental data for each of coefficients a-d, we further designed a set of nine equations, each describing the relationship of the thirteen design variables with regard to each of nine different performance characteristics ($\Phi$). Specifically, the nine performance characteristics are particle size, discharge rate, sound, particle density, obscuration, cone angle, pressure, plume distance, and percent retention. The nine equations, in which $x_1$ represents the exit orifice diameter, $x_2$ represents the vapor diameter, $x_3$ is the dip tube inner diameter, $x_4$ represents the body orifice diameter, $x_5$ is the propellant level expressed as weight percent of total formula, $x_6$ is the stem cross sectional area, $x_7$ is the formula density, $x_8$ is the formula low sheer viscosity, $x_9$ is the formula high sheer viscosity, $x_{10}$ is the initial surface tension, $x_{11}$ is the equilibrium surface tension, $x_{12}$ is the partition coefficient, and $x_{13}$ is the formula Zahn viscosity, are as follows:

Particle Size=$1.02242+0.020189x_1-0.03558x_2+0.028524x_3+0.01881x_4-0.03043x_5+0.021079x_6+0.029504x_7-0.00535x_8+0.040358x_9+0.026648x_{10}+0.015943x_{11}+0.001972x_{12}+0.019852x_1^2+0.006888x_2^2+-0.00473x_3^2+0.003088x_4^2+0.030126x_5^2+0.004829x_6^2+0.032177x_7^2+0.027742x_8^2+0.047886x_9^2+0.013803x_{10}^2+0.002631x_{11}^2+-0.02662x_{12}^2+0.00559x_1x_2+0.003922x_1x_3+0.003114x_1x_4+0.007078x_1x_5+0.027877x_1x_6+-0.00023x_1x_7+0.019868x_1x_8+-0.01783x_1x_9+0.001017x_1x_{10}+0.009209x_1x_{11}+0.001512x_1x_{12}+-0.00656x_2x_3+0.003563x_2x_4+0.039802x_2x_5+0.019974x_2x_6-0.02326x_2x_7+0.013677x_2x_8-0.04709x_2x_9-0.01323x_2x_{10}-0.00098x_2x_{11}-0.00323x_2x_{12}-0.00692x_3x_4-0.01672x_3x_5-0.00633x_3x_6+0.013559x_3x_7-0.00115x_3x_8+0.02198x_3x_9+0.004453x_3x_{10}-0.00339x_3x_{11}-0.00711x_3x_{12}-0.00526x_4x_5+0.004338x_4x_6+0.001217x_4x_7+0.011902x_4x_8+0.007015x_4x_9-0.0044x_4x_{10}-0.00038x_4x_{11}-0.00507x_4x_{12}+0.009622x_5x_6-0.04585x_5x_7+0.031734x_5x_8-0.04584x_5x_9-0.04106x_5x_{10}-0.01688x_5x_{11}+0.011187x_5x_{12}-0.03085x_6x_7+0.028799x_6x_8-0.02425x_6x_9-0.02704x_6x_{10}-0.00894x_6x_{11}+0.037972x_6x_{12}-0.02732x_7x_8+0.041934x_7x_9+0.023323x_7x_{10}+0.005648x_7x_{11}+0.02588x_7x_{12}-0.04158x_8x_9-0.01622x_8x_{10}-0.00646x_8x_{11}-0.00417x_8x_{12}+0.036569x_9x_{10}+0.008854x_9x_{11}+0.003271x_9x_{12}+0.004109x_{10}x_{11}+0.017316x_{10}x_{12}-0.00167x_{11}x_{12}+0.022459x_1^3-0.03464x_2^3+0.011414x_3^3+0.011475x_4^3+-0.03619x_5^3+0.018012x_6^3+0.045755x_7^3-0.01043x_8^3+0.050374x_9^3+0.036743x_{10}^3+0.005254x_{11}^3+0.006486x_{12}^3$;

Discharge Rate=$1.97251+0.151659x_1-0.09387x_2+0.044069x_3+0.105745x_4-0.02886x_5+0.011448x_6+0.004139x_7-0.00745x_8+0.021374x_9+0.012198x_{10}+0.010043x_{11}+0.041509x_{12}+0.054939x_1^2+0.051303x_2^2-0.01275x_3^2-0.0012x_4^2+0.012869x_5^2-0.00657x_6^2-0.0036x_7^2+0.033547x_8^2+0.00759x_9^2+0.005179x_{10}^2+0.002703x_{11}^2+-0.01654x_{12}^2-0.0166x_1x_2+0.038124x_1x_3+0.160107x_1x_4-0.0219x_1x_5+0.064876x_1x_6+0.001247x_1x_7+0.072415x_1x_8-0.031x_1x_9+0.008707x_1x_{10}+0.036214x_1x_{11}+0.043642x_1x_{12}-0.02578x_2x_3-0.0054x_2x_4+0.058388x_2x_5+0.010039x_2x_6+0.007209x_2x_7+0.004467x_2x_8-0.02463x_2x_9-0.00125x_2x_{10}-0.00936x_2x_{11}-0.07407x_2x_{12}+0.015713x_3x_4+0.001232x_3x_5+0.011068x_3x_6-0.00419x_3x_7-0.02304x_3x_8+0.000683x_3x_9-0.00043x_3x_{10}-0.03171x_3x_{11}-0.00293x_3x_{12}+0.014435x_4x_5+0.103632x_4x_6-0.01161x_4x_7+0.089624x_4x_8-0.05221x_4x_9+0.000186x_4x_{10}+0.055521x_4x_{11}+0.037988x_4x_{12}-0.01749x_5x_6+0.000613x_5x_7+0.021328x_5x_8-0.00898x_5x_9-0.00632x_5x_{10}+0.026617x_5x_{11}-0.02054x_5x_{12}+0.008046x_6x_7-0.00155x_6x_8+0.0220522x_6x_9+0.007172x_6x_{10}+0.006274x_6x_{11}+0.024721x_6x_{12}+0.003731x_7x_8+0.00134x_7x_9-0.00059x_7x_{10}+0.00461x_7x_{11}+0.042774x_7x_{12}-0.02377x_8x_9-0.00854x_8x_{10}+0.001237x_8x_{11}-0.05727x_8x_{12}+0.007039x_9x_{10}-0.01395x_9x_{11}+0.036771x_9x_{12}+0.002841x_{10}x_{11}+0.045303x_{10}x_{12}-0.02869x_{11}x_{12}+0.093209x_1^3-0.06197x_2^3+0.023225x_3^3+0.061508x_4^3-0.00103x_5^3+0.011261x_6^3+0.004287x_7^3-0.02291x_8^3+0.00242x_9^3+0.00917x_{10}^3+0.005267x_{11}^3+0.045112x_{12}^3$;

Sound=$7.38894+0.026742x_1-0.01638x_2+0.04281x_3+0.025547x_4-0.00357x_5+0.048313x_6+0.028191x_7+0.035819x_8+0.031666x_9+0.030996x_{10}+0.023535x_{11}-0.02013x_{12}+0.019148x_1^2-0.01656x_2^2-0.02273x_3^2+0.022702x_4^2-0.01904x_5^2+0.048313x_6^2+0.012587x_7^2+0.035819x_8^2+0.039736x_9^2+0.010099x_{10}^2+0.016861x_{11}^2+0.020133x_{12}^2-0.00452x_1x_2+0.004144x_1x_3+0.002858x_1x_4-0.0024x_1x_5+0.003753x_1x_6-0.00074x_1x_7+0.00522x_1x_8+0.005049x_1x_9-0.00036x_1x_{10}-0.0013x_1x_{11}+0.001662x_1x_{12}+0.000684x_2x_3-0.00385x_2x_4-0.00069x_2x_5+0.000316x_2x_6+0.00305x_2x_7-0.00328x_2x_8-0.00373x_2x_9+0.00279x_2x_{10}+0.003453x_2x_{11}-0.00372x_2x_{12}+0.00474x_3x_4+0.000638x_3x_5+0.0022x_3x_6-0.00751x_3x_7+0.0098x_3x_8+0.009859x_3x_9-0.0071x_3x_{10}-0.00803x_3x_{11}+0.008325x_3x_{12}-0.00049x_4x_5+0.00492x_4x_6-0.00018x_4x_7+0.005647x_4x_8+0.005367x_4x_9+0.000251x_4x_{10}-0.00082x_4x_{11}+0.001234x_4x_{12}-0.00138x_5x_6-0.00043x_5x_7-0.00274x_5x_8-0.00313x_5x_9-0.00055x_5x_{10}-0.00019x_5x_{11}-0.00874x_6x_7+0.010221x_6x_8+0.010084x_6x_9-0.0086x_6x_{10}-0.00891x_6x_{11}+0.009017x_6x_{12}-0.04274x_7x_8-0.03895x_7x_9+0.011269x_7x_{10}+0.014546x_7x_{11}-0.01586x_7x_{12}+0.037692x_8x_9-0.03892x_8x_{10}-0.04676x_8x_{11}+0.048313x_8x_{12}-0.03498x_9x_{10}-0.04378x_9x_{11}+0.046138x_9x_{12}+0.012998x_{10}x_{11}-0.01415x_{10}x_{12}-0.01841x_{11}x_{12}+$ $0.027778x_1^3 - 0.01309x_2^3 + 0.036303x_3^3 + 0.023364x_4^3 - 0.01094x_5^3 + 0.048313x_6^3 + 0.022901x_7^3 + 0.035819x_8^3 + 0.033803x_9^3 + 0.023737x_{10}^3 + 0.021426x_{11}^3 - 0.02013x_{12}^3;$ Particle Density = $2.45095 + 0.056911x_1 - 0.02547x_2 + 0.035392x_3 + 0.063021x_4 - 0.02141x_5 + 0.026533x_6 + 0.007117x_7 + 0.017984x_8 + 0.002493x_9 + 0.010357x_{10} + 0.014961x_{11} + 0.011524x_{12} + 0.047108x_1^2 - 0.01174x_2^2 - 0.01861x_3^2 + 0.038345x_4^2 - 0.00697x_5^2 - 0.01057x_6^2 + 0.003872x_7^2 - 0.0083x_8^2 + 0.006773x_9^2 + 0.001558x_{10}^2 + 0.011899x_{11}^2 - 0.01653x_{12}^2 - 0.01971x_1x_2 + 0.044156x_1x_3 + 0.061013x_1x_4 - 0.02613x_1x_5 + 0.049497x_1x_6 + 0.016483x_1x_7 + 0.039852x_1x_8 - 0.00416x_1x_9 + 0.021733x_1x_{10} + 0.029445x_1x_{11} + 0.023708x_1x_{12} - 0.01149x_2x_3 - 0.02346x_2x_4 + 0.022425x_2x_5 + 0.006611x_2x_6 + 0.011029x_2x_7 - 0.03002x_2x_8 + 0.021802x_2x_9 + 0.009328x_2x_{10} - 0.00972x_2x_{11} - 0.02582x_2x_{12} + 0.045162x_3x_4 + 0.006813x_3x_5 + 0.001243x_3x_6 - 0.00368x_3x_7 - 0.00166x_3x_8 + 0.006068x_3x_9 - 0.00479x_3x_{10} - 0.00633x_3x_{11} - 0.00016x_3x_{12} - 0.03104x_4x_5 + 0.05386x_4x_6 + 0.005894x_4x_7 + 0.048969x_4x_8 - 0.00371x_4x_9 + 0.011962x_4x_{10} + 0.023165x_4x_{11} + 0.03798x_4x_{12} - 0.00665x_5x_6 - 0.00212x_5x_7 + 0.004262x_5x_8 - 0.009x_5x_9 - 0.00223x_5x_{10} + 0.003334x_5x_{11} + 0.004338x_5x_{12} - 0.01567x_6x_7 + 0.027931x_6x_8 - 0.01255x_6x_9 - 0.01473x_6x_{10} - 0.00361x_6x_{11} + 0.02413x_6x_{12} + 0.011386x_7x_8 - 0.02627x_7x_9 + 0.002514x_7x_{10} + 0.012248x_7x_{11} + 0.012998x_7x_{12} + 0.0228x_8x_9 + 0.012983x_8x_{10} - 0.01216x_8x_{12} - 0.02476x_9x_{10} - 0.01748x_9x_{11} + 0.030308x_9x_{12} + 0.011252x_{10}x_{11} + 0.014292x_{10}x_{12} - 0.00773x_{11}x_{12} + 0.052275x_1^3 - 0.01903x_2^3 + 0.037711x_3^3 + 0.048608x_4^3 - 0.00608x_5^3 + 0.021142x_6^3 + 0.016012x_7^3 + 0.018832x_8^3 - 0.00158x_9^3 + 0.017871x_{10}^3 + 0.013703x_{11}^3 + 0.012493x_{12}^3;$ Obscuration = $8.24578 + 0.032121x_1 - 0.02279x_2 + 0.004699x_3 + 0.059724x_4 + 0.001958x_5 + 0.008303x_6 + 0.020526x_7 - 0.01901x_8 + 0.004571x_9 + 0.019143x_{10} + 0.00769x_{11} - 0.0229x_{12} + 0.01986x_1^2 - 0.01039x_2^2 - 0.01366x_3^2 + 0.028154x_4^2 + 0.000849x_5^2 - 0.01802x_6^2 - 0.00742x_7^2 + 0.014405x_8^2 + 0.002793x_9^2 - 0.00571x_{10}^2 + 0.007787x_{11}^2 + 0.002037x_{12}^2 - 0.00637x_1x_2 + 0.033587x_1x_3 + 0.071868x_1x_4 - 0.01921x_1x_5 - 0.03998x_1x_6 + 0.013785x_1x_7 + 0.038661x_1x_8 - 0.00876x_1x_9 + 0.018389x_1x_{10} + 0.027643x_1x_{11} + 0.024317x_1x_{12} - 0.00026x_2x_3 - 0.01744x_2x_4 + 0.025161x_2x_5 + 0.023736x_2x_6 + 0.020978x_2x_7 - 0.04015x_2x_8 + 0.042188x_2x_9 - 0.019808x_2x_{10} - 0.00896x_2x_{11} - 0.03748x_2x_{12} + 0.055993x_3x_4 + 0.010058x_3x_5 - 0.01993x_3x_6 + 0.003156x_3x_7 - 0.00335x_3x_8 - 0.01321x_3x_9 + 0.001888x_3x_{10} + 0.005114x_3x_{11} - 0.00293x_3x_{12} - 0.03812x_4x_5 + 0.060898x_4x_6 + 0.008386x_4x_7 + 0.063183x_4x_8 - 0.01171x_4x_9 + 0.015708x_4x_{10} + 0.031822x_4x_{11} + 0.04901x_4x_{12} + 0.011424x_5x_6 + 0.001467x_5x_7 - 0.0065x_5x_8 + 0.016742x_5x_9 + 0.001764x_5x_{10} - 0.00779x_5x_{11} - 0.00619x_5x_{12} - 0.00526x_6x_7 + 0.004821x_6x_8 - 0.01895x_6x_9 - 0.00635x_6x_{10} + 0.001205x_6x_{11} + 0.006172x_6x_{12} + 0.011567x_7x_8 - 0.00626x_7x_9 - 0.00645x_7x_{10} + 0.000141x_7x_{11} + 0.018514x_7x_{12} - 0.01825x_8x_9 + 0.01298x_8x_{10} + 0.022242x_8x_{11} + 0.007854x_8x_{12} - 0.0082x_9x_{10} - 0.01307x_9x_{11} - 0.01035x_9x_{12} + 0.001155x_{10}x_{11} + 0.018629x_{10}x_{12} + 0.022884x_{11}x_{12} + 0.021485x_1^3 - 0.02269x_2^3 + 0.009551x_3^3 + 0.041445x_4^3 + 0.00075x_5^3 + 0.012889x_6^3 + 0.015186x_7^3 - 0.01925x_8^3 + 0.001584x_9^3 + 0.014079x_{10}^3 + 0.007827x_{11}^3 - 0.02214x_{12}^3;$ Cone Angle = $2.70885 + 0.021366x_1 - 0.03962x_2 + 0.047914x_3 + 0.035503x_4 - 0.03691x_5 + 0.001203x_6 + 0.015198x_7 - 0.03926x_8 + 0.036577x_9 + 0.032725x_{10} + 0.034635x_{11} + 0.053338x_{12} - 0.00397x^{12} + 0.00571x_2^2 + 0.014994x_3^2 + 0.008997x_4^2 + 0.019043x_5^2 + 0.015281x_6^2 - 0.02601x_7^2 - 0.00777x_8^2 - 0.00345x_9^2 - 0.01587x_{10}^2 + 0.00484x_{11}^2 + 0.043587x_{12}^2 - 0.03112x_1x_2 + 0.013006x_1x_3 + 0.022038x_1x_4 - 0.02772x_1x_5 - 0.01622x_1x_6 - 0.00344x_1x_7 - 0.00836x_1x_8 + 0.01271x_1x_9 + 0.005357x_1x_{10} + 0.011335x_1x_{11} + 0.036205x_1x_{12} - 0.02126x_2x_3 - 0.01394x_2x_4 + 0.020421x_2x_5 - 0.00948x_2x_6 + 0.005915x_2x_7 + 0.020406x_2x_8 - 0.00201x_2x_9 - 0.0092x_2x_{10} - 0.00019x_2x_{11} - 0.03657x_2x_{12} - 0.00138x_3x_4 - 0.01147x_3x_5 + 0.007132x_3x_6 - 0.01844x_3x_7 - 0.02384x_3x_8 - 0.00712x_3x_9 + 0.002477x_3x_{10} - 0.00895x_3x_{11} + 0.043427x_3x_{12} + 0.001865x_4x_5 + 0.016474x_4x_6 - 0.0273x_4x_7 - 0.01278x_4x_8 - 0.01844x_4x_9 - 0.00896x_4x_{10} - 0.01999x_4x_{11} + 0.033969x_4x_{12} - 0.02396x_5x_6 + 0.000798x_5x_7 + 0.030897x_5x_8 - 0.00788x_5x_9 - 0.01467x_5x_{10} - 0.00652x_5x_{11} - 0.05111x_5x_{12} + 0.009809x_6x_7 + 0.022324x_6x_8 + 0.030356x_6x_9 - 0.0014x_6x_{10} + 0.030552x_6x_{11} + 0.025413x_6x_{12} + 0.026313x_7x_8 - 0.00997x_7x_9 - 0.0244x_7x_{10} - 0.01069x_7x_{11} + 0.041825x_7x_{12} - 0.0063x_8x_9 + 0.012645x_8x_{10} - 0.00343x_8x_{11} - 0.07299x_8x_{12} - 0.00242x_9x_{10} - 0.00417x_9x_{11} + 0.038013x_9x_{12} - 0.00401x_{10}x_{11} + 0.060776x_{10}x_{12} + 0.036186x_{11}x_{12} + 0.022793x_1^3 - 0.021x_2^3 + 0.025947x_3^3 + 0.022057x_4^3 - 0.00757x_5^3 - 0.00764x_6^3 + 0.012537x_7^3 - 0.03446x_8^3 + 0.000567x_9^3 + 0.021362x_{10}^3 + 0.070315x_{12}^3;$ Pressure = $20.146 + 0.001606x_1 - 0.00157x_2 - 0.01102x_3 - 0.00512x_4 - 0.02228x_6 + 0.031527x_7 - 0.02256x_8 + 0.000473x_9 + 0.028061x_{10} + 0.031675x_{11} - 0.0225x_{12} - 0.00155x_1^2 + 0.010763x_2^2 + 0.010396x_3^2 - 0.00868x_4^2 + 0.012005x_5^2 - 0.00966x_6^2 + 0.028266x_7^2 - 0.01323x_8^2 + 0.00959x_9^2 + 0.038205x_{10}^2 + 0.035067x_{11}^2 + 0.005174x_{12}^2 + 0.005264x_1x_2 + 0.008645x_1x_3 + 0.014905x_1x_4 - 0.00428x_1x_5 + 0.007265x_1x_6 + 0.014497x_1x_7 + 0.002712x_1x_8 - 0.00264x_1x_9 + 0.014982x_1x_{10} + 0.01645x_1x_{11} - 0.00371x_1x_{12} - 0.0102x_2x_3 - 0.01634x_2x_4 + 0.008678x_2x_5 - 0.00295x_2x_6 - 0.01112x_2x_7 + 0.006164x_2x_8 - 0.00808x_2x_9 - 0.01192x_2x_{10} - 0.01342x_2x_{11} - 0.00181x_2x_{12} + 0.00685x_3x_4 - 0.00966x_3x_5 - 0.00752x_3x_6 + 0.030844x_3x_7 - 0.01512x_3x_8 + 0.00838x_3x_9 + 0.032327x_3x_{10} + 0.04927x_3x_{11} - 0.00813x_3x_{12} - 0.00809x_4x_5 - 0.00267x_4x_6 + 0.007687x_4x_7 - 0.00777x_4x_8 + 0.0081x_4x_9 + 0.008088x_4x_{10} + 0.002885x_4x_{11} + 0.001726x_4x_{12} + 0.006037x_5x_6 - 0.00536x_5x_7 + 0.002949x_5x_8 - 0.00804x_5x_9 - 0.00645x_5x_{10} - 0.01181x_5x_{11} - 0.0103x_5x_{12} + 0.045387x_6x_7 - 0.02568x_6x_8 - 0.00199x_6x_9 + 0.042554x_6x_{10} + 0.045691x_6x_{11} - 0.05369x_6x_{12} + 0.023331x_7x_8 - 0.00107x_7x_9 + 0.033551x_7x_{10} + 0.032591x_7x_{11} + 0.002343x_7x_{12} - 0.00943x_8x_9 + 0.019852x_8x_{10} + 0.039406x_8x_{11} - 0.01609x_8x_{12} - 0.00119x_9x_{10} - 0.02501x_9x_{11} + 0.016276x_9x_{12} + 0.03415x_{10}x_{11} - 0.00178x_{11}x_{12} - 0.00323x_{11}x_{12} - 0.00201x_1^3 + 0.001195x_2^3 + 0.002178x_3^3 - 0.00665^3 - 0.00126x_5^3 - 0.02392x_6^3 + 0.020046x_7^3 - 0.02634x_8^3 + 0.005933x_9^3 + 0.019063x_{10}^3 + 0.033268x_{11}^3 + -0.01123x_{12}^3;$ Plume Distance=$8.47195+0.134035x_1+0.024587x_2-0.00591x_3-0.00121x_4+0.029373x_5-0.01279x_6-0.00145x_7-0.00608x_9-0.00044x_{10}+0.004423x_{11}+0.003591x_{12}-0.034x_{12}-0.02678x_2^2+0.000807x_3^2-0.00117x_4^2-0.01043x_5^2+0.01042x_6^2+0.000465x_7^2-0.00513x_8^2-0.00671x_9^2+0.006745x_{10}^2+0.006807x_{11}^2+0.000229x_{12}^2-0.16456x_1x_2-0.1232x_1x_3-0.05175x_1x_4+0.050366x_1x_5-0.12799x_1x_6-0.09659x_1x_7+0.087161x_1x_8-0.09055x_1x_9-0.10417x_1x_{10}-0.01662x_1x_{11}+0.089629x_1x_{12}-0.01777x_2x_3-0.01361x_2x_4+0.036105x_2x_5-0.02007x_2x_6-0.01751x_2x_7+0.019088x_2x_8-0.00572x_2x_9-0.02107x_2x_{10}-0.005218x_3x_7-0.015746x_2x_{12}+0.004536x_3x_4-0.01895x_3x_5-0.00352x_3x_6+0.005218x_3x_7-0.00538x_3x_8-0.00241x_3x_9+0.008381x_3x_{10}+0.00998x_3x_{11}-0.00164x_3x_{12}-0.01368x_4x_5-0.00035x_4x_6+0.001684x_4x_7-0.00189x_4x_8-0.00298x_4x_9+0.00377x_4x_{10}+0.002718x_4x_{11}-0.00014x_4x_{12}-0.03197x_5x_6-0.02521x_5x_7+0.015795x_5x_8-0.00259x_5x_9-0.03336x_5x_{10}-0.04147x_5x_{11}+0.01898x_5x_{12}+0.007965x_6x_7+0.000574x_6x_8-0.00693x_6x_9+0.007068x_6x_9+0.007068x_6x_{10}+0.010917x_6x_{11}-0.01754x_6x_{12}+0.009478x_7x_8-0.00782x_7x_9+0.003488x_7x_{10}+0.006995x_7x_{11}-0.001x_7x_{12}+0.003307x_8x_9+0.00554x_8x_{10}+0.006926x_8x_{11}-0.0095x_8x_{12}-0.0063x_9x_{10}-0.00801x_9x_{11}+0.003685x_9x_{12}+0.00724x_{10}x_{11}+0.000122x_{10}x_{12}-0.00708x_{11}x_{12}+0.04182x_1^3+-0.04492x_2^3+0.00096x_4^3+0.006162x_5^3-0.01267x_6^3-0.00523x_7^3-0.00223x_8^3-0.00845x_9^3-0.00311x_{10}^3+0.006253x_{11}^3+0.00516x_{12}^3$; and Percent Retention=$0.982825+-0.02391x_1+0.084759x_2-0.08371x_3-0.06564x_4+0.008044x_5-0.12778x_6-0.04314x_7+0.017305x_8-0.03647x_9-0.05469x_{10}-0.02432x_{11}-0.00783x_{12}-0.03049x_{13}+0.016071x_1^2+0.020052x_2^2+0.020108x_3^2+0.013103x_4^2-0.03464x_5^2-0.03219x_6^2+0.019116x_7^2-0.0513x_8^2-0.00152x_9^2+0.041001x_{10}^2+0.004421x_{11}^2-0.01817x_{12}^2-0.02382x_{13}^2+0.009411x_1x_2+0.023905x_1x_3-0.01828x_1x_4+0.009926x_1x_5+0.028073x_1x_6+0.009302x_1x_7+0.005117x_1x_8+0.010795x_1x_9+0.011949x_1x_{10}+0.00229x_1x_{11}-0.00187x_1x_{12}+0.002244x_1x_{13}+0.002633x_2x_3-0.04247x_2x_4+0.011388x_2x_5+0.023313x_2x_6-0.01525x_2x_7+0.008021x_2x_8-0.01601x_2x_9-0.01682x_2x_{10}-0.00762x_2x_{11}+0.003743x_2x_{12}-0.0125x_2x_{13}-0.00789x_3x_4+0.018049x_3x_5+0.002883x_3x_6+0.019916x_3x_7+0.001147x_3x_8+0.001717x_3x_9+0.026735x_3x_{10}+0.058168x_3x_{11}-0.00863x_3x_{12}+0.001678x_3x_{13}-0.01916x_4x_5-0.04879x_4x_6+0.018234x_4x_7-0.03089x_4x_8+0.031874x_4x_9+0.019199x_4x_{10}-0.01056x_4x_{11}+0.010709x_4x_{12}+0.033027x_4x_{13}+0.011707x_5x_6+0.011863x_5x_7-0.03772x_5x_8+0.015436x_5x_9+0.010773x_5x_{10}+0.001233x_5x_{11}+0.002817x_5x_{12}+0.027431x_5x_{13}+0.019074x_6x_7-0.02021x_6x_8-0.00086x_6x_9+0.021167x_6x_{10}+0.025906x_6x_{11}-0.00384x_6x_{12}+0.012694x_6x_{13}+0.007573x_7x_8+0.006812x_7x_9+0.029657x_7x_{10}+0.015844x_7x_{11}-0.00401x_7x_{12}+0.002139x_7x_{13}+0.016428x_8x_9+0.004873x_8x_{10}-0.01017x_8x_{11}+0.013787x_8x_{12}+0.037146x_8x_{13}+0.012707x_9x_{10}+0.01806x_9x_{11}-0.00493x_9x_{12}-0.0078x_9x_{13}+0.019522x_{10}x_{11}-0.01004x_{10}x_{12}+0.006228x_{10}x_{13}+0.000745x_{11}x_{12}+0.016644x_{11}x_{13}-0.01298x_{12}x_{13}-0.01375x_1^3+0.045362x_2^3-0.06845x_3^3-0.05693x_4^3-0.00331x_5^3-0.10765x_6^3-0.02638x_7^3+0.019447x_8^3-0.01641x_9^3-0.04216x_{10}^3-0.00223x_{11}^3-0.006x_{12}^3-0.02542x_{13}^3$.

These mathematical equations predict the outcome of the relationships between the thirteen design variables, in the form of the value of a desired performance characteristic. The design of the equations is based on our identification of the design factors (as discussed above), experimentation on the effect of variation of the values of those factors on the performance characteristic, both individually and commutatively, examples of which are discussed in the copending U.S. patent application Ser. No. 10/896,897, entitled "Method of Designing Improved Spray Dispenser Assemblies," and analysis of the experimental data, which was performed using Design Expert, a software package supplied by Statease of Minneapolis, Minn.

Having obtained the equations, we then performed exemplary experiments, to validate the equations. Specifically, as shown in tabular form in FIGS. 5-7, we examined given dispensing systems characterized by the thirteen design variables discussed above. As set forth in FIGS. 5-7, "Example Formula" refers to a formula having properties $x_7$-$x_{13}$ as discussed below in Examples 1-8, "Exit Orifice" refers to the exit orifice diameter $x_i$, "Vapor Tap" refers to the vapor tap diameter $x_2$, "Dip Tube" refers to the dip tube diameter $x_3$, "Body Orifice" refers to the body orifice diameter $x_4$, "% Propellant" refers to the propellant concentration $x_5$, and "Stem Orifice" refers to the cross sectional area of the stem orifice $x_6$. Thus, we measured values for each of $x_1$-$x_{13}$, for different aerosol dispensing systems.

After obtaining the x values, we first predicted the value of the performance characteristics using the equations we developed. The results of each of these predictions are set forth in T.2-T.4 under the "Predicted" column headings. Then, we obtained the actual value of the performance characteristic of the system, using known methods. These results are set forth in T.2-T.4 under the "Actual" column headings.

More specifically, the "actual" values of the performance characteristics were obtained according to the following methodologies. Particle size was obtained using a Malvern Mastersizer S by spraying aerosols from a horizontal distance of 16", except for in examples 7 and 8, which were sprayed from 8" (to avoid impingement of spray on the instrument lens). Results were averaged over a minimum of two measurements collected during the first 40 seconds of sample life, and, for most samples, a cutoff was applied (typically at 300 μm) to eliminate high particle size ghost peaks caused by "beam steering." The discharge rate was determined from ASTM D 3069-94 (Reapproved 1999) 99 in *Book of ASTM Standards*, American Society for Testing and Materials, West Conshohocken, Pa. The sound level was collected with a Metrosonics Db-308 dosimeter with the microphone held 3 inches away from the spray nozzle, perpendicular to the source. The particle density was calculated using:

$$\text{particle density}=20\ln(1-O)\div 3b\Sigma(v_iQ_i\div d_i)$$

Where $v_i$ is the percentage relative volume in class i with mean diameter $d_i$ (in microns);

O is the obscuration;

$Q_i$ is the extinction efficiency at size $d_i$ which depends on the particle optical properties; and b is the beam length (in mm) through which the particle passes.

Obscuration was measured as the percentage of a Malvern probe laser beam blocked from transmission to the detector. Essentially, obscuration is a measure of the optical 'thickness', and is related approximately to concentration of particles in the spray. Obscuration %=100−Transmittance %. Cone angle was measured by analysis of high-speed digital images taken perpendicular to the spray. The photographs were enhanced in contrast (~99%) and sharpness (~70%), and the angle was measured 16 inches from the spray nozzle. Pressure was obtained according to ASTM D 3070-00 99 in the Book of ASTM standards, American Society for Testing and Materials, West Conshohocken, Pa. Plume distance was measured by analysis of high speed digital images taken perpendicular to the spray. To calibrate, a tape measure was present in each recorded image. Retention is the weight of material remaining in the aerosol after complete discharge of propellant. Spray down was performed with a maximum of 10 second spray time within any 1 hour period, and the weight of retained product was determined by the difference in the final weight of the discharged package minus the weight of the package following opening the container and rinsing the contents away with acetone (and drying).

The "Example Formulas" referred to in T.2-T.4, from which the fluid design variables ($x_7$-$x_{13}$) were obtained are:

Example 1

A solution containing deionized water (217 g), monosodium phosphate (2.15 g), and sodium hydroxide (0.700 g) was added to a 202/700 aerosol can rated to DOT-2P. To this was added a solution containing sorbitan monooleate (1.71 g), propylene glycol (0.171 g), trimethyl stearyl ammonium chloride (0.0829 g of a 50 weight percent solution in isopropyl alcohol/deionized water at 3/1), and fragrance oil (0.781 g). A valve with the dimensions specified in tables T.2-T.4 below was crimped with initial vacuum level of 18" Hg. Propellant (45.6 g of a mixture of 70 wt % isobutane and 30 wt % propane) was added through the valve.

Fluid properties of this formula were obtained by replacing the gaseous propellant mixture with an equal weight of n-heptane. Fluid density was 0.900 g/ml, low sheer viscosity was 300 centipoises, high sheer viscosity was 1 centipoises, initial surface tension was 21.0 mN/m, equilibrium surface tension was 19.2 mN/m, the partition coefficient was 0.29, and the Zahn viscosity was 0.3 centistokes.

Example 2

A solution containing deionized water (212 g), monosodium phosphate (2.10 g), and sodium hydroxide (0.679 g) was added to a 202/700 aerosol can rated to DOT-2P. To this was added a solution containing sorbitan monooleate (1.71 g), propylene glycol (0.171 g), trimethyl stearyl ammonium chloride (0.0829 g of a 50 weight percent solution in isopropyl alcohol/deionized water at 3/1), and fragrance oil (0.781 g). A valve with the dimensions specified in tables T.2-T.4 below was crimped with an initial vacuum level of 18" Hg. Propellant (51.1 g of a mixture of 70 wt % isobutane and 30 wt % propane) was added through the valve.

Fluid properties of this formula were obtained by replacing the gaseous propellant mixture with an equal weight of n-heptane. Fluid density was 0.900 g/ml, low sheer viscosity was 300 centipoises, high sheer viscosity was 1 centipoise, initial surface tension was 21.0 mN/m, equilibrium surface tension was 19.2 mN/m, the partition coefficient was 0.29, and the Zahn viscosity was 0.3 centistokes.

Example 3

A solution containing deionized water (223 g), monosodium phosphate (2.20 g), and sodium hydroxide (0.713 g) was added to a 202/700 aerosol can rated to DOT-2P. To this was added a solution containing sorbitan monooleate (1.71 g), propylene glycol (0.171 g), trimethyl stearyl ammonium chloride (0.0829 g of a 50 weight percent solution in isopropyl alcohol/deionized water at 3/1), and fragrance oil (0.781 g). A valve with the dimensions specified in tables T.2-T.4 below was crimped with an initial vacuum level of 18" Hg. Propellant (40.4 g of a mixture of 70 wt % isobutane and 30 wt % propane) was added through the valve.

Fluid properties of this formula were obtained by replacing the gaseous propellant mixture with an equal weight of n-heptane. Fluid density was 0.900 g/ml, low sheer viscosity was 300 centipoises, high sheer viscosity was 1 centipoise, initial surface tension was 21.0 mN/m, equilibrium surface tension was 19.2 mN/m, the partition coefficient was 0.29, and the Zahn viscosity was 0.3 centistokes.

Example 4

A solution containing deionized water (228 g), monosodium phosphate (2.25 g), sodium hydroxide (0.730 g) was added to a 202/700 aerosol can rated to DOT-2P. To this was added a solution containing sorbitan monooleate (1.71 g), propylene glycol (0.171 g), trimethyl stearyl ammonium chloride (0.0829 g of a 50 weight percent solution in isopropyl alcohol/deionized water at 3/1), and fragrance oil (0.781 g). A valve with the dimensions specified in tables T.2-T.4 below was crimped with an initial vacuum level of 18" Hg. Propellant (35.0 g of a mixture of 70 wt % isobutane and 30 wt % propane) was added through the valve.

Fluid properties of this formula were obtained by replacing the gaseous propellant mixture with an equal weight of n-heptane. Fluid density was 0.9 g/ml, low sheer viscosity was 300 centipoises, high sheer viscosity was 1 centipoise, initial surface tension was 21.0 mN/m, equilibrium surface tension was 19.2 mN/m, the partition coefficient was 0.29, and the Zahn viscosity was 0.3 centistokes.

Example 5

A solution containing deionized water (267 g), monobasic ammonium phosphate (0.375 g) and ammonium nitrite (0.375 g) was added to an epoxy lined 202/205-710 aerosol can. To this was added a solution light petroleum distillate (17.0 g), ethoxylated (3.5 moles) stearic acid (1.53 g), d-cis/trans allethrin, (0.878 g), 3-phenoxybenzyl d-cis and trans 2,2-dimethyl-3-(2-methyl propenyl) cyclopropanecarboxylate (95.7%, 0.348 g), fragrance oil (0.681 g), tall oil fatty acid (0.444 g), and diethanolamine (0.0671 g). A valve with the dimensions specified in tables T.2-T.4 below was crimped with an initial vacuum level of 15" Hg. Propellant (51.0 g of a mixture of 75 wt % isobutane and 25 wt % propane) was added through the valve.

Fluid properties of this formula were obtained by replacing the gaseous propellant mixture with an equal weight of n-heptane. Fluid density was 0.937 g/ml, low sheer viscosity was 300 centipoises, high sheer viscosity was 0.1 centipoise, initial surface tension was 34.6 mN/m, equilibrium surface tension was 30.5 mN/m, the partition coefficient was 0.25, and the Zahn viscosity was 0.2 centistokes.

Example 6

A solution containing deionized water (267 g), monobasic ammonium phosphate (0.375 g), and ammonium nitrite (0.375 g) was added to an epoxy lined 202/205-710 aerosol can. To this was added a solution tripropylene glycol methyl ether (16.4 g), ethoxylated (3.5 moles) stearic acid (0.364 g), d-cis/trans allethrin (0.878 g), 3-phenoxybenzyl d-cis and trans 2,2-dimethyl-3-(2-methyl propenyl)cyclopropanecarboxylate (95.7%, 0.348 g), fragrance oil (0.681 g), and sorbitan monooleate (2.18 g). A valve with the dimensions specified in tables T.2-T.4 below was crimped with initial vacuum level of 15" Hg. Propellant (51.0 g of a mixture of 75 wt % isobutane and 25 wt % propane) was added through the valve.

Fluid properties of this formula were obtained by replacing the gaseous propellant mixture with an equal weight of n-heptane. Fluid density was 0.907 g/ml, low sheer viscosity was 315 centipoises, high sheer viscosity was 8 centipoises, initial surface tension was 24.5 mN/m, equilibrium surface tension was 20.1 mN/m, the partition coefficient was 0.29, and the Zahn viscosity was 1.7 centistokes.

Example 7

A vigorously agitated mixture containing tap water (200 g), 32F Flash isoparafinic hydrocarbon (24.8 g), polydimethyl siloxane (17.3 g), polydimethylsiloxanediol (2.48 g), sorbitan monooleate (1.73 g), formaldehyde (37% aqueous, 0.619 g), and fragrance oil (0.990 g) was added to a 202/700 aerosol can. A valve with the dimensions specified in tables T.2-T.4 below was crimped with initial vacuum level of 18" Hg. Propellant (27.5 g of a mixture of 40 wt % n-butane, 26 wt % isobutane, and 34 wt % propane) was added through the valve.

Fluid properties of this formula were obtained by replacing the gaseous propellant mixture with an equal weight of n-heptane. Fluid density was 0.922 g/ml, low sheer viscosity was 195 centipoises, high sheer viscosity was 35 centipoises, initial surface tension was 30.9 mN/m, equilibrium surface tension was 20.8 mN/m, the partition coefficient was 0.31, and the Zahn viscosity was 114 centistokes.

Example 8

A vigorously agitated mixture containing tap water (208 g), 32F Flash isoparafinic hydrocarbon (25.8 g), polydimethyl siloxane (18.0 g), polydimethylsiloxanediol (2.58 g), sorbitan monooleate (1.80 g), formaldehyde (37% aqueous, 0.646 g), and fragrance oil (1.03 g) was added to a 202/700 aerosol can. A valve with the dimensions specified in tables T.2-T.4 below was crimped with an initial vacuum level of 18" Hg. Propellant (16.5 g of a mixture of 40 wt % n-butane, 26 wt % isobutane, and 34 wt % propane) was added through the valve.

Fluid properties of this formula were obtained by replacing the gaseous propellant mixture with an equal weight of n-heptane. Fluid density was 0.941 g/ml, low sheer viscosity was 195 centipoises, high sheer viscosity was 69 centipoises, initial surface tension was 34.4 mN/m, equilibrium surface tension was 22.5 mN/m, the partition coefficient was 0.27, and the Zahn viscosity was 134 centistokes.

The results of our experiments, as compared to the actual results, are as shown in FIGS. 5-7. As shown therein, our methodologies and resultant equations closely describe the as-measured characteristics of given systems, for nine different performance characteristics. We are confident in our novel equations, and we envision many uses therefor, some of which are set forth hereinafter.

As a first example, this equation can be used to design an aerosol spray dispenser optimized with regard to one or more specified performance characteristics, for use with a given formula to be dispensed. As discussed above, certain performance characteristics are more important than others, depending upon the application. Accordingly, the method for designing the aerosol spray dispenser in this embodiment includes selecting an appropriate performance characteristic. For example, particle size is preferably kept small when the aerosol dispenser dispenses an air freshener. Thus, for an air freshener, a desired particle size measurement would be used as the value for Φ. Also, because the formula to be dispensed is known in this example (as is typically the case), the x factors relating to properties of the fluid formula, i.e., $x_7$-$x_{13}$ will be known. Consequently, with the understanding that $x_5$ is to be minimized (to lower VOCs), values for $x_1$, $x_2$, $x_3$, $x_4$, and $x_6$ can be ascertained by solution of the equation. As should be understood, solution of the equation will result in more than one set of values for $x_1$-$x_4$ and $x_6$ that will achieve the desired performance characteristic, and any of these sets of values can be used to design and fabricate a desirable spray container.

While solution of the equation will provide various configurations of aerosol spray containers, many of the configurations may still prove unsatisfactory. For example, while a design for a spray assembly may provide an ideal particle size, it may result in an unacceptable spray rate, and thus the spray assembly would be overall unsatisfactory. In fact, an ideal spray container will likely be designed based on more than one performance characteristic.

In particular, we envision that the different equations will be utilized to ascertain values of unknown design variables, i.e., $x_1$, $x_2$, $x_3$, $x_4$, and $x_5$ in this example, for each or any of the nine performance characteristics. By then comparing the results ascertained for each of the desired performance characteristics, the values for $x_1$, $x_2$, $x_3$, $x_4$, and $x_6$ that are common to some or all of the desired performance characteristics, can be ascertained, thereby enabling the design of a truly optimal spray assembly for a given formula.

As a second exemplary implementation of our novel mathematical equations, it may be desirable to ascertain the value of a performance characteristic, given design factors of a particular spray dispenser assembly. In this example, all of the x values would be known (or could readily be measured) and, by solving the equation, a resulting performance characteristic is readily calculated.

As a third exemplary implementation of the novel equations, it is also possible to determine a preferable formula to be dispensed from a given aerosol spray container. More particularly, it is possible to determine the viscosities, density, partition coefficient, and surface tensions of a formula that will optimally function in a spray assembly of given dimensions. In other words, it is possible to determine $x_7$-$x_{13}$, when $x_1$, $x_2$, $x_3$, $x_4$, and $x_6$ are known and a desired performance characteristic is selected.

As a fourth implementation of our equations, it may be desirable to ascertain the VOC content form an aerosol system, given design factors of a particular spray dispenser assembly and the value of a performance characteristic. In this example, all of the x values, with the exception of $x_5$, would be known, and the VOC content is determined by solving the equation.

As should now be readily apparent, our equation provides a way to design aerosol spray containers without laborious testing and research. Containers for a myriad applications and formulas are thus readily attainable. The equations may be used in various ways to make the desired determinations.

The embodiments discussed above are representative of preferred embodiments of the present invention and are provided for illustrative purposes only. They are not intended to limit the scope of the invention. In fact, we envision modification to our invention. For example, we anticipate that a different number of design variables may be used in our novel equations. Moreover, derivations of our equations, e.g., other equations formed using our equations, may also be used to model the relationship between design variables and the performance characteristics. Contemplated within such derived equations are equations formed through mathematical manipulation of the several variables. Such derivations are intended to fall within the scope of our invention.

Although specific components, configurations, materials, etc., have been shown and described, such also are not limiting. For example, various other combinations of valve components, propellant types, propellant pressures, and valve orifice dimensions, can be used without departing from the spirit and scope of our invention, as defined in the claims. In addition, the teachings of the various embodiments may be combined with one another, as appropriate, depending on the desired feature to be solved for, such as performance characteristics of the valve.

We claim:

1. A method of determining a preferred fluid for dispensing from an aerosol spray container in an aerosol spray dispensing system and designing the aerosol spray dispensing system, the method comprising the steps of:
   predetermining a propellant concentration ($x_5$) for the aerosol dispensing system;
   determining properties of an aerosol spray container for use in the aerosol spray dispensing system, the properties including an exit orifice diameter ($x_1$), a vapor tap diameter ($x_2$), a dip tube diameter ($x_3$), a body orifice diameter ($x_4$), and a stem cross section area ($x_6$);
   selecting a value for each of one or more desired performance characteristics ($\Phi$) of the system;
   determining fluid properties of a fluid for dispensing from a provided aerosol spray container in accordance with the following equation:

$$\Phi = a_0 + \sum_{i=1}^{13} b_i x_i + \sum_{i=1}^{13}\sum_{j=1}^{13} c_{ij} x_i x_j + \sum_{i=1}^{13}\sum_{j=1}^{13}\sum_{k=1}^{13} d_{ijk} x_i x_j x_k,$$

wherein the fluid properties include a density ($x_7$), a low sheer viscosity ($x_8$), a high sheer viscosity ($x_9$), an initial surface tension ($x_{10}$), an equilibrium surface tension ($x_{11}$), a partition coefficient ($x_{12}$), and a Zahn viscosity ($x_{13}$), and a, b, c, and d are coefficients unique to each of the one or more performance characteristic; and
   designing the aerosol spray dispensing system according to properties determined in the determining steps.

2. A method of ascertaining a value of a performance characteristic for an aerosol spray dispensing system, the method comprising the steps of:
   providing an aerosol spray dispensing system including (i) an aerosol spray container having an exit orifice diameter ($x_1$), a vapor tap diameter ($x_2$), a dip tube diameter ($x_3$), a body orifice diameter ($x_4$), and a stem cross section area ($x_6$), (ii) a fluid formula to be dispensed from the aerosol spray container, the fluid formula having a density ($x_7$), a low sheer viscosity ($x_8$), a high sheer viscosity ($x_9$), an initial surface tension ($x_{10}$), an equilibrium surface tension ($x_{11}$), a partition coefficient ($x_{12}$), and a Zahn viscosity ($x_{13}$), and (iii) a propellant concentration ($x_5$);
   determining a value of the performance characteristic ($\Phi$) of the system in accordance with the following equation:

$$\Phi = a_0 + \sum_{i=1}^{13} b_i x_i + \sum_{i=1}^{13}\sum_{j=1}^{13} c_{ij} x_i x_j + \sum_{i=1}^{13}\sum_{j=1}^{13}\sum_{k=1}^{13} d_{ijk} x_i x_j x_k,$$

wherein a, b, c, and d are coefficients unique to the performance characteristic to be determined.

3. A method of ascertaining propellant concentration for an aerosol spray dispensing system, the method comprising the steps of:
   providing an aerosol spray dispensing system including (i) an aerosol spray container having an exit orifice diameter ($x_1$), a vapor tap diameter ($x_2$), a dip tube diameter ($x_3$), a body orifice diameter ($x_4$), and a stem cross section area ($x_6$), and (ii) a fluid formula to be dispensed from the aerosol spray container, the fluid formula having a density ($x_7$), a low sheer viscosity ($x_8$), a high sheer viscosity ($x_9$), an initial surface tension ($x_{10}$), an equilibrium surface tension a partition coefficient ($x_{12}$), and a Zahn viscosity ($x_{13}$);
   providing a value of a performance characteristic ($\Phi$) of the aerosol spray dispensing system;
   determining a propellant concentration ($x_5$) of the system in accordance with the following equation:

$$\Phi = a_0 + \sum_{i=1}^{13} b_i x_i + \sum_{i=1}^{13}\sum_{j=1}^{13} c_{ij} x_i x_j + \sum_{i=1}^{13}\sum_{j=1}^{13}\sum_{k=1}^{13} d_{ijk} x_i x_j x_k,$$

wherein a, b, c, and d are coefficients unique to the performance characteristic.

4. A method according to claim 1, further comprising the step of providing the designed aerosol spray dispensing system including the aerosol spray container and fluid.

5. A method according to claim 1, further comprising:
   selecting values for multiple of the one or more desired performance characteristics of the system; and
   determining values of one or more design variables of the aerosol dispenser for each of the one or more performance characteristics; and
   designing the aerosol container according to design variables commonly determined for each of the one or more performance characteristics.

* * * * *

UNITED STATES PATENT AND TRADEMARK OFFICE
CERTIFICATE OF CORRECTION

PATENT NO. : 7,593,790 B2 Page 1 of 1
APPLICATION NO. : 11/186057
DATED : September 22, 2009
INVENTOR(S) : Valpey, III et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,593,790 B2 | Page 1 of 1 |
| APPLICATION NO. | : 11/186057 | |
| DATED | : September 22, 2009 | |
| INVENTOR(S) | : Richard S. Valpey, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1043 days.

Column 24, Line 29: insert --($x_{11}$)-- after "tension"

Signed and Sealed this

Second Day of November, 2010

David J. Kappos
*Director of the United States Patent and Trademark Office*